United States Patent
Uchida et al.

(10) Patent No.: US 6,843,761 B1
(45) Date of Patent: Jan. 18, 2005

(54) PAPER FEED ROLLER AND METHOD OF MANUFACTURE

(75) Inventors: Kiyohiko Uchida, Chiba (JP); Hiroo Ushioda, Chiba (JP); Satoshi Ozawa, Chiba (JP); Yasuhiko Shimada, Chiba (JP); Sousuke Miyaji, Chiba (JP); Noriyuki Kozakai, Tokyo (JP); Tatsuya Okamura, Tokyo (JP); Masayoshi Konishi, Osaka (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 09/486,262

(22) PCT Filed: Jun. 24, 1999

(86) PCT No.: PCT/JP99/03368

§ 371 (c)(1),
(2), (4) Date: Jun. 12, 2000

(87) PCT Pub. No.: WO99/67163

PCT Pub. Date: Dec. 29, 1999

(30) Foreign Application Priority Data

| Jun. 24, 1998 | (JP) | ............................................. 10-177100 |
| Feb. 5, 1999 | (JP) | ............................................. 11-028137 |
| Mar. 5, 1999 | (JP) | ............................................. 11-059310 |

(51) Int. Cl.[7] .............................. F16C 13/00; B21K 1/02
(52) U.S. Cl. ............................. 492/40; 492/53; 492/59; 29/895.32; 29/895.213
(58) Field of Search ............................. 492/53, 59, 56, 492/40, 38, 39, 41; 29/895.213, 895.2, 895.21, 895.3, 895.32, 895.33; 271/109, 314

(56) References Cited

U.S. PATENT DOCUMENTS

| 2,658,262 | A | * | 11/1953 | Clements | ...................... 492/59 |
| 3,577,619 | A | * | 5/1971 | Strandel | ................. 29/895.212 |
| 4,010,528 | A | * | 3/1977 | Bohmer | ....................... 492/40 |
| 4,033,497 | A | | 7/1977 | Przygocki | |
| 4,529,567 | A | | 7/1985 | Richard | |
| 4,533,581 | A | * | 8/1985 | Asaumi et al. | ............. 428/64.1 |

(List continued on next page.)

FOREIGN PATENT DOCUMENTS

| DE | 3617316 A1 | * 11/1986 | ................. 162/373 |
| EP | 0 734 873 A2 | 10/1996 | |
| EP | 0 736 369 A1 | 10/1996 | |
| JP | 61-23045 | 1/1986 | |
| JP | 63-42659 | 3/1988 | |
| JP | 1-261159 | 10/1989 | |
| JP | 3-7668 | 1/1991 | |
| JP | 8-73094 | 3/1996 | |
| JP | 8-324047 | 12/1996 | |
| JP | 10-16326 | 1/1998 | |
| JP | 10-52951 | 2/1998 | |
| JP | 10-58557 | 3/1998 | |

*Primary Examiner*—Marc Jimenez
(74) *Attorney, Agent, or Firm*—Young & Thompson

(57) ABSTRACT

The present invention relates to paper feed rollers required to transfer papers in printers, facsimiles, copiers, etc. with accurately, and provides novel paper feed rollers which are lighter, less expensive and mass-producible with larger diameters as compared with conventional paper feed rollers. The paper feed roller according to the present invention includes a rotary shaft, a cylindrical roller portion formed by press molding a mixture of a hydraulic composition, followed by curing and hardening, and integrated with an outer periphery of the rotary shaft.

27 Claims, 9 Drawing Sheets

U.S. PATENT DOCUMENTS

| | | | |
|---|---|---|---|
| 4,542,566 A | * | 9/1985 | Sukenik .................... 492/59 |
| 4,583,272 A | * | 4/1986 | Keller ...................... 492/49 |
| 4,587,699 A | * | 5/1986 | Kadomatsu et al. ........... 492/8 |
| 4,718,154 A | * | 1/1988 | Bauer et al. ................ 193/37 |
| 4,876,875 A | * | 10/1989 | Bruggeman et al. .......... 72/199 |
| 4,880,467 A | * | 11/1989 | Rirsch et al. ................ 524/8 |
| 5,257,965 A | * | 11/1993 | Fuchs et al. ................ 492/40 |
| 5,267,008 A | * | 11/1993 | Rebres et al. ............... 492/40 |
| 5,384,957 A | * | 1/1995 | Mohri et al. ............. 29/895.32 |
| 5,548,897 A | * | 8/1996 | Link ......................... 492/54 |
| 5,649,362 A | * | 7/1997 | Yamamoto et al. ............ 492/8 |
| 5,766,753 A | * | 6/1998 | Murata et al. ............... 492/56 |
| 5,807,004 A | * | 9/1998 | Takei et al. ............... 400/661.1 |
| 5,856,251 A | * | 1/1999 | Teranishi et al. ............ 501/89 |
| 5,893,210 A | * | 4/1999 | Takei et al. .............. 29/895.32 |
| 5,903,808 A | * | 5/1999 | Takizawa et al. ............ 492/56 |
| 6,284,150 B1 | * | 9/2001 | Ogata et al. ............ 252/62.63 |
| 6,440,347 B1 | * | 8/2002 | Izawa et al. ............. 29/895.23 |
| 2003/0155548 A1 | * | 8/2003 | Ozawa et al. ......... 252/62.51 R |

* cited by examiner

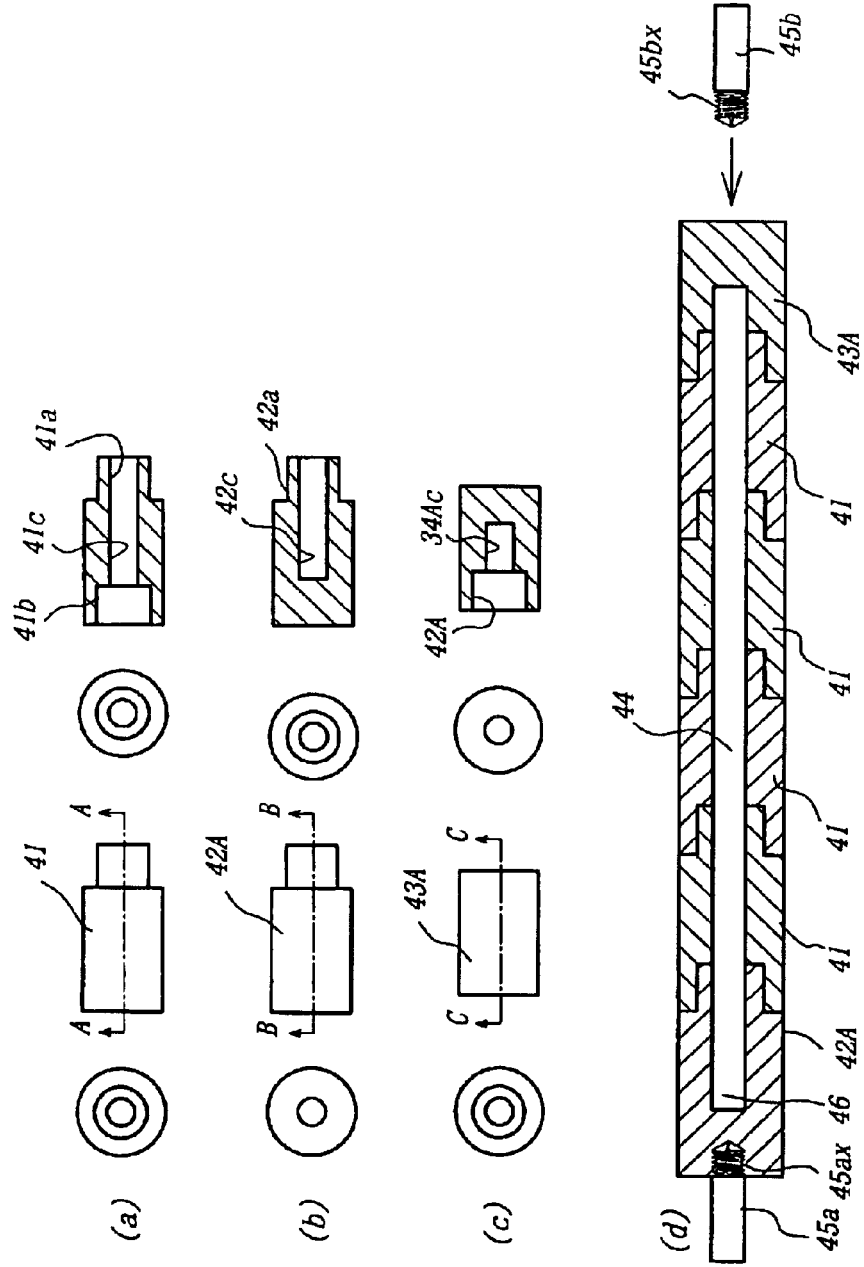

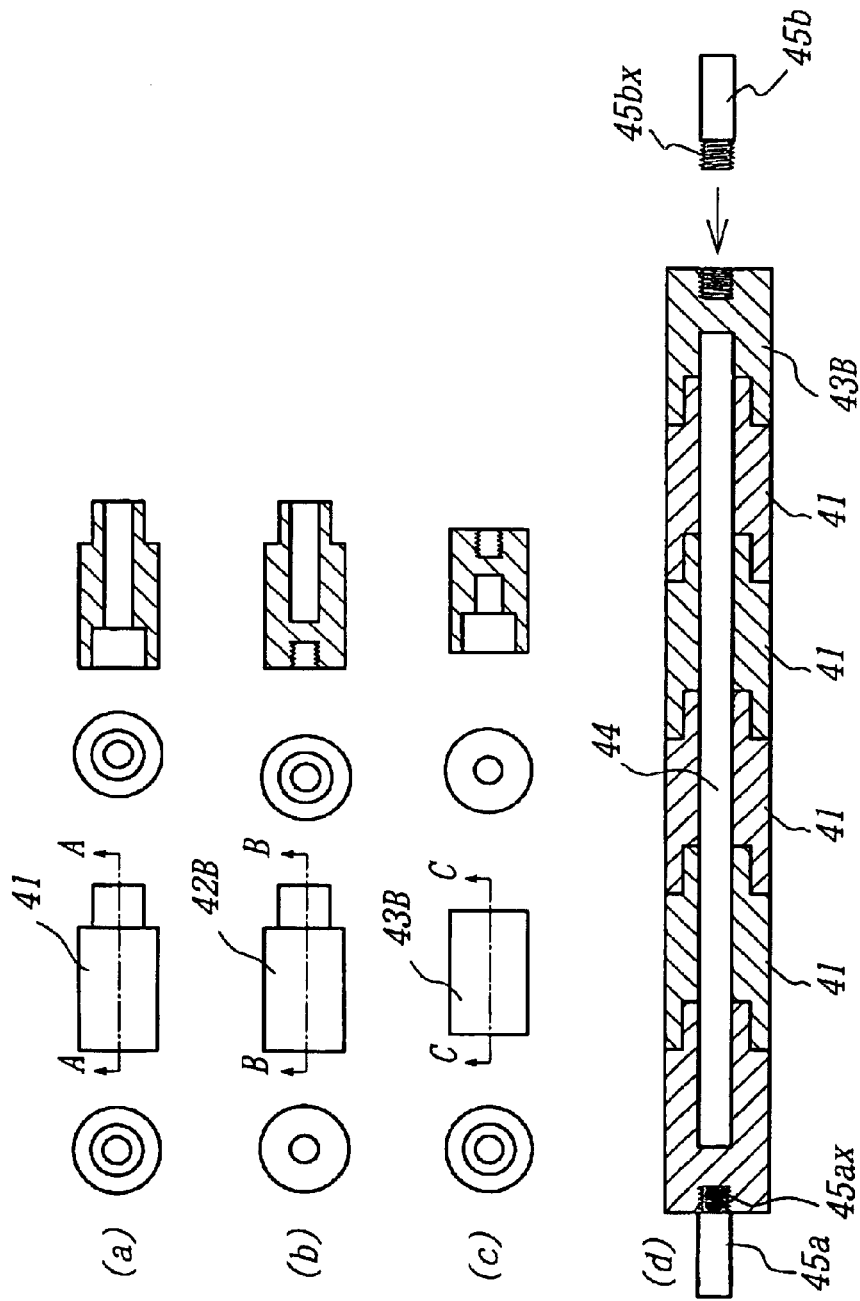

PAPER FEED ROLLER AND METHOD OF MANUFACTURE

TECHNICAL FIELD

The present invention relates to paper feed rollers in which a hydraulic composition is used for roller portions and which are employed in apparatuses, such as printers, facsimile machines and copying machines, requiring papers to be accurately conveyed. The invention also relates to a method for producing the same.

BACKGROUND ART

Conventionally, metallic materials have been widely used as materials for mechanical parts as utilizing various material characteristics of the metallic materials. Further, needs for mechanical parts have been increasing with recent row progress in the technology, and mechanical parts using non-metallic materials such as sintered ceramics or plastics have often been utilized to supplement defects of the metallic materials. However, while the technological innovations have been progressively effected, it is an actual situation that all the needs cannot be supplemented by the conventional materials. Therefore, new materials particularly having excellent cutting and grinding workability that can be used for new mechanical parts have been demanded.

Meanwhile, paper feed rollers in printing machines such as printers, facsimile machines and copying machines are generally made of metals in such a structure that their surfaces are edged or coated with a paint to increase a frictional coefficient. Recent higher accuracy tendency of the printing machines has increased demands for the accuracy paper feeding. Particularly, in the color ink jet type printer, etc., the accuracy in feeding both the ink particles and papers needs to be controlled in an order of microns to improve the power of expression of photographs. It is known that increase in the diameter of the paper feed roller is effective to enhance the paper-feeding accuracy.

For example, it is expected that the 36 mm-diameter roller has the paper-feed accuracy of 3 times as much as that of the 12 mm-diameter roller.

However, if a large-diameter roller is to be made of a conventional metal, it is clear that it is more difficult to cut its part in this case as compared with a small-diameter roller, that among other things, it is extremely difficult to entirely finish grinding it in an error range of a micron order, and that the production requires a huge cost It is also clear that increase in the diameter of the metallic roller gains the weigh In this case, it is impossible to control the roller by means of the conventional driving mechanism, that is, a motor, gears, etc. for the small diameter roller. Further, it is necessary to effect the entire change in design and the reinforcement of the driving motor and the gear wheels. This directly leads to large increase in not only the weight but the cost of the entire product.

As mentioned above, although the increase in the diameter of the roller enhances the paper-feed accuracy and can consequently provide a product having high accuracy power of printing expression, it is difficult to attain this with the conventional metallic materials at a low cost.

Many techniques have been disclosed to form ceramic layers on surfaces of rotary bodies. For example, JP-A 3-7668 and JP-A 8-73094 disclose paper feed rollers in which a film is formed on a surface of a metallic cylindrical roller portion by flame spraying. However, the ceramic flame spraying is not suitable for obtaining large-diameter rollers. Further, JP-A 61-23,045 discloses a paper feed roller composed of an inner portion of an elastic body layer and an outermost portion of a ceramic layer. It is pointed out that increase in the thickness of the ceramic layer peels the ceramic layer from the elastic body layer.

Further, JP-A 1-261,159 discloses a structure in which a sintered ceramic outer layer and a metallic inner layer are preliminarily prepared and the sintered ceramic outer layer is externally fitted around the metallic inner layer for a roller in a copper foil-producing roller. If the sintered ceramic outer layer is used in this manner, the method must be employed to separately mold a ceramic body, sinter it, and fitting or bonding the sintered body into the rotary shaft. Further, if the roller is to be grindded to enhance the accuracy of the roller, it is difficult to grind it without relying upon a grinding stone of such as diamond because the roller is hard, and the working speed will be extremely low. This will increase the cost.

JP-A 10-16,326 discloses that a compounding mixture is obtained by mixing a defoaming agent, a tackifier, an inflating agent, a curing promoter, etc. with main components including cement, aggregate and a flowing agent, a flowing fill-in mixture is obtained by kneading the compounding mixture with water, filling the flowing fill-in mixture into a mold in which a core rod is inserted, cured and hardened to obtain a core member for a platen, and the core member is press fitted into a cylindrical rubber, followed by grinding the surface of the rubber if necessary. According to WP-A 1052,951, the same flowing fill-in mixture is filled in a space between a core rod and a cylindrical rubber as an outermost peripheral portion, and cured and hardened to obtain a platen. Since the flowing fill-in mixture is used to mold the platen core member, designing in the compounding mixture is complicated, which leads to increase in cost.

JP-A 8-324,047 discloses a light-weight and noise-preventing roller for an image-forming apparatus, which is obtained by filling a flowing solidifiable material such as a ceramic material including cement in a space between a rotary shaft and a surface layer made of hard rubber. Since it is difficult to cut the surface of the hard rubber at high accuracy, the above roller cannot be employed as a roller requiring grinding for attaining high accuracy.

Further, since a large amount of water is used to cast cement, etc. into a mold, the molded body suffers from a volumetric change through removal of water, which causes insufficient shape and dimensional stability and does not fit high accuracy.

Therefore, no structure has been available for such paper feed rollers, which satisfy "light", "inexpensive", "highly accurate" and "easy to design a gear portion" without effecting large design changes upon the paper feed mechanism for the conventional paper feed rollers, and appearance thereof have been eagerly desired.

DISCLOSURE OF THE INVENTION

(1) First Aspect of the Present Invention

A first aspect of the present invention is to provide novel, lighter and less inexpensive large-diameter paper feed rollers which can be mass produced by using a hydraulic composition so as to comply with the above requirements for the conventional paper feed rollers.

The paper feed roller according to the first aspect of the present invention comprises a rotary shaft and a cylindrical roller portion which is integrated with an outer periphery and formed by pressing a mixture composed of a hydraulic composition and curing and hardening the pressed product In the above paper feed roller according to the present invention, the cylindrical roller portion made of the hydraulic composition is integrated with the rotary shaft or form a composite therewith, so that the roller has excellent workability. Since a substantially conventional rotary shaft is used as the rotary shaft and the periphery of the rotary shaft is provided with the inexpensive hydraulic composition is provided around the periphery of the rotary shaft integrally or as a composite, the first aspect of the present invention can cope with increase in size and diameter. Further, the weight of the roller can be simultaneously reduced.

In addition, as to the conventional sintered ceramics, the cylindrical roller portion preliminarily prepared by sintering the ceramic material is integrated with the rotary shaft by fitting or bonding. When the hydraulic composition in the present invention in the present invention is used, it can be integrated with the rotary shaft without being sintered. As to working, the conventional sintered ceramics need, long-term working, which are unsuitable for mass production. On the other hand, since the roller according to the present invention has the same workability as the metallic materials, light and inexpensive large-diameter rollers can be provided.

(2) Second Aspect of the Present Invention

Having further investigated the paper feed roller according to the present invention, the present inventors discovered the following points to be discovered. That is, the paper feed roller according to the first aspect of the present invention is ordinarily produced by pressing the hydraulic composition in a cylindrical form around the rotary shaft. However, this method has the defects that molds need be prepared for respective kinds of rollers; the mold and the pressing apparatus for molding the paper feed roller become huge to comply with large-size papers of A3, thereby resulting in cost-up; and that increase in the size of the mold makes the pressing in the pressing step non-uniform, which degrades the moldability and leads to increased finish working to attain desired accuracy of the paper feed roller.

The second aspect of the present invention is to solve the above problems, and to provide the paper roller and the producing method thereof which enables the light weight, less inexpensive, large diameter, excellent concentricity between the rotary shaft and the roller portion, and high shape/dimension stability through the use of the hydraulic composition for satisfying various requirements for the conventional paper feed rollers.

The paper feed roller according to the second aspect of the present invention comprises a rotary shaft and a cylindrical roller portion which is integrated with an outer periphery and formed by pressing a mixture composed of a hydraulic composition and curing and hardening the pressed product, wherein the cylindrical roller portion is formed by connecting a plurality of cylindrical molded bodies in a direction of the rotary shaft. As a preferred embodiment of the present invention, connecting end portions of the cylindrical molded bodies to be connected to each other have interengaging shapes, respectively, and the cylindrical molded bodies are fitted and connected to each other at these end portions. Here, the interengaging shapes means such shapes of the opposed end portions that a projection is fitted into a recess portion firmly or loosely slidably movable.

The method for producing the paper feed roller according to the second aspect of the present invention comprises the steps of forming a plurality of cylindrical molded bodies each having a hole at a central portion through molding the hydraulic composition, and releasing, curing and hardening the molded bodies, inserting a rotary shaft though the holes of a plurality of the cylindrical molded bodies, connecting the adjacent cylindrical molded bodies, and thereby integrally forming the cylindrical roller portion around the outer peripheral surface of the rotary shaft.

Another method for producing the paper feed roller according to the second aspect of the present invention comprises the steps of forming a plurality of cylindrical green molded bodies each having a hole at a central portion through molding the hydraulic composition, and releasing the green molded bodies, inserting a rotary shaft though the holes of a plurality of the cylindrical green molded bodies, connecting the adjacent cylindrical green molded bodies, fanning a cylindrical shaped body through curing and hardening the connected cylindrical green molded bodies, and integrally forming the cylindrical roller portion around the outer peripheral surface of the rotary shaft.

According to the paper feed roller and the producing method thereof in the second aspect of the present invention, since the cylindrical molded body made of the hydraulic composition is integrated with the rotary shaft, the paper feed roller has excellent concentricity between the rotary shaft and the roller portion. Further, since the pressed roller portion of the hydraulic composition is formed in an integrated shape, the roller has excellent shape/dimension stability with excellent paper feed accuracy.

Further, since each of the cylindrical molded bodies themselves can be shortened as compared with the length of the desired roller portion, the mold can be made smaller. Further, if a plurality of cylindrical molded bodies are preliminarily prepared, which have a single shape with a length of each cylindrical molded body set by the relationship between the size of the papers and the number of the cylindrical molded bodies to be connected, plural kinds of paper feed rollers can be easily produced by using a given number of the cylindrical molded bodies having the unitary shape to comply with the papers to be used. In addition, as compared with the case where the roller portion is molded integrally with the rotary shaft, the cylindrical molded bodies and in turn the roller portion can be more accurately formed, so that the finish working labor can be reduced and the production cost can be lowered.

(3) Third Aspect of the Present Invention

Inventors's farther investigations of the paper feed rollers according to the first and second aspects of the present invention revealed that there were points to be further improved. That is, according to the methods of producing these paper feed rollers, it is possible to relatively easily enhance the accuracy of each of the cylindrical molded bodies of the hydraulic composition, so that high accuracy can be realized before working with respect to the integrated cylindrical roller portion obtained by connecting these cylindrical roller portions. In addition, plural molds need not be prepared for respective kinds of roller portions in the paper feed rollers according to the present invention, the second aspect has an advantage of realizing the cost reduction.

However, a single rotary shaft is used in the above method. If a roller having a higher accuracy is to be produced, the accuracy of the rotary shaft used has a large influence on that of the roller. In order to realize a roller having a higher accuracy, it was necessary to prepare a rotary shaft having a higher accuracy or to make working for enhancing the concentricity of the rotary shaft for the cylindrical portion in the finish working. This led to the cost-up. Cylindrical grinding is noted as a method for enhancing the concentricity between the rotary shaft and the cylindrical roller portion, but there is a limit upon a realizable accuracy in that the working takes a time, and that increase in the length of the roller is expected to degrade the working accuracy.

The third aspect of the present invention is to solve the above problems, and to provide the paper roller and the producing method thereof which enables the light weight, less inexpensive, large diameter, excellent concentricity between the rotary shaft and the roller portion, and high shape/dimension stability through the use of the hydraulic composition.

The paper feed roller according to the third aspect of the present invention comprises a rotary shaft and a cylindrical roller portion which is constituted by a cylindrical molded body prepared by pressing a mixture composed of a hydraulic composition and curing and hardening the pressed body, wherein the rotary shaft is constituted by two rotary shaft portions which are integrated by inserting them into central portions in opposite end faces of the cylindrical axially inwardly from opposite sides in the state that outer peripheral surface of the cylindrical roller portion is concentrically aligned with the rotary shaft.

As preferred embodiments of the paper feed roller the third aspect of the present invention, the following (a) to (c) may be recited. Any combination of (a) to (c) is embraced in the preferred embodiments of the paper feed roller according to the third aspect of the present invention.
(a) The cylindrical roller portion is constituted by a plurality of cylindrical molded bodies axially connected to each other.
(b) At least one set of two adjacent cylindrical molded bodies connected are connection-reinforced by a connection core rod extended between central portions of the two cylindrical molded bodies.
(c) Connecting end portions of the cylindrical molded bodies to be connected to each other have interengaging shapes, respectively, and the cylindrical molded bodies are fitted and connected to each other at these end portions.

In the paper feed rollers according to the first, second and third aspects of the present invention, the following embodiments (d) and/or (e) are recited as preferred embodiments.
(d) The above hydraulic composition comprises 100 parts by weight of a mixed powder composed of 50 to 90 wt % of a hydraulic powder and 10 to 50 wt % of a non-hydraulic powder having the average particle diameter smaller than that of the hydraulic powder by an order of one digit or more, and 2 to 18 parts by weight of a workability improver.
(e) The above workability improver is a powder or an emulsion of at least one kind of resins selected from a vinyl acetate resin, a copolymer resin with vinyl acetate, acrylic resin or a copolymer with acryl, a styrene resin or a copolymer with styrene, and an epoxy resin.

The method for producing the paper feed roller according to the third aspect of the present invention comprises the steps of forming a cylindrical roller portion from a cylindrical molded body shaped through molding the hydraulic composition, and releasing, curing and hardening the molded body, attaching two rotary shaft portions to opposite end portions of the cylindrical roller portion in the state that while the two rotary shaft portions are concentric with the outer peripheral surface of the cylindrical roller portion, the two rotary shaft portions are aligned with each other, and thereby forming a rotary shaft by the two rotary shaft portions.

The method for producing the paper feed roller according to the present invention comprises the steps of molding the hydraulic composition, releasing the molded bodies, forming a cylindrical green roller portion from the cylindrical molded bodies, attaching two rotary shaft portions to opposite end portions of the cylindrical roller portion in the state that while the two rotary shaft portions are concentric with the outer peripheral surface of the cylindrical roller portion, the two rotary shaft portions are aligned with each other, and thereby forming a rotary shaft by the two rotary shaft portions, and then curing and hardening the roller portion while a rotary shaft is formed by the two rotary shaft portions.

As preferred embodiments of the method for producing the paper feed roller according to the present invention, the following (a) to (e) are recited. Any combination of (a) to (e) is embraced in the preferred embodiments of the method for producing the paper feed roller according to the present invention.
(a) The cylindrical molded body is so formed that holes may be formed at central portions of the opposite end portions of the cylindrical roller portion, while holes being concentric with the outer peripheral surface of the cylindrical roller portion, and the rotary shaft by integrally inserting and integrally fixing the rotary shaft portions into the holes, respectively, in the state that the shaft portions are aligned with each other. Herein, the cylindrical shaped body includes the non-cured "cylindrical molded body".
(b) A screw portion is provided at one end of the rotary shaft portion, and the rotary shaft portion is attached to the end portion of the cylindrical roller portion by screwing the screw portion of the rotary shaft portion into the end portion of the cylindrical roller portion.
(c) A plurality of cylindrical molded bodies are formed by molding the hydraulic composition, releasing, curing and hardening the molded bodies, and the cylindrical roller portion is formed by connecting the cylindrical molded bodies. By so doing, since each of the cylindrical molded bodies themselves can be shortened as compared with the length of the desired roller portion, the mold can be made smaller. Further, if a plurality of cylindrical molded bodies are preliminarily prepared, which have a single shape with a length of each cylindrical molded body set by the relationship between the size of the papers and the number of the cylindrical molded bodies to be connected, plural kinds of paper feed rollers can be easily produced by using a given number of the cylindrical molded bodies having the unitary shape to comply with the papers to be used. In addition, as compared with the case where the roller portion is molded integrally with the rotary shaft, the cylindrical molded bodies and in turn the roller portion can be more accurately formed, so that the finish working labor can be reduced and the production cost can be lowered
(d) At least one set of two adjacent cylindrical molded bodies are connected by a connection core rod. By so doing, in the case that the cylindrical roller portion is constituted by axially connected a plurality of the cylindrical molded bodies, the cylindrical molded bodies can be more firmly connected. It is preferable to align the connecting core rod with the rotary shaft portions at the opposite end portions. If such an alignment is effected, the connecting rod may be considered as a central rotary shaft portion of the rotary shaft. However, if the concentricity is ensured between the rotary shaft portions at the opposite end portions and the cylindrical roller portion, it is unnecessary to ensure high concentricity between this central rotary shaft portion and the cylindrical roller portion.

(e) Connecting end portions of the cylindrical molded bodies to be connected to each other have interengaging shapes, respectively, and the cylindrical molded bodies are fitted and connected to each other at these end portions. By so doing, when the cylindrical roller portion is formed by axially connecting a plurality of the cylindrical molded bodies, the cylindrical molded bodies can be more fly connected to each other.

According to the paper feed roll and the producing process thereof in the third aspect of the present invention, since the rotary shaft is formed by the rotary shaft portions which are inserted and fixed into the concentric holes provided in the opposite end portion of the cylindrical roller portion in the aligned state, it is easier to adjust and ensure the concentricity between the rotary shaft constituted by the two rotary shaft portions and the cylindrical roller portion as compared with the case of using a unitary rotary shaft Further, since the cylindrical roller portion is integrally formed from the molded body of the hydraulic composition, the cylindrical roller portion has excellent shape/dimension stability as well as excellent paper-feeding accuracy.

BRIEF SUMMARY OF THE DRAWINGS

FIG. 9(a) shows a cylindrical molded body 41 in a central portion of another embodiment of the paper feed roller according to the third aspect of the present invention with a left side view at the left, a front view neighboring on the right, a right side view neighboring on the right, and an A—A line sectional view neighboring on the right as cut and viewed along the A—A line in the front view; FIG. 9(b) likewise shows a cylindrical molded body 42A at the left side; FIG. 9(c) likewise shows a cylindrical molded body 43A at the right side; and FIG. 9(d) is a sectional view of the paper feed roller in a state in which the cylindrical molded bodies 41, 41, 41, 41, 42A, 43A are fitted and connected around a connecting rod, and rotary shaft portions 45a are integrally fixed and assembled to end portion of the cylindrical roller portion.

FIG. 10(a) shows a cylindrical molded body 41 in a central portion of a further embodiment of the paper feed roller according to the third aspect of the present invention with a left side view at the left, a front view neighboring on the right, a right side view neighboring on the right, and an A—A line sectional view neighboring on the right as cut and viewed along the A—A line in the front view;

FIG. 10(b) likewise shows a cylindrical molded body 42B at the left side; FIG. 10(c) likewise shows a cylindrical molded body 43B at the right side; and FIG. 10(d) is a sectional view of the paper feed roller in a state in which the cylindrical molded bodies 41, 41, 41, 41, 42B, 43B are fitted and connected around a connecting rod, and rotary shaft portions 45a are integrally fixed and assembled to end portion of the cylindrical roller portion.

Figure 1:
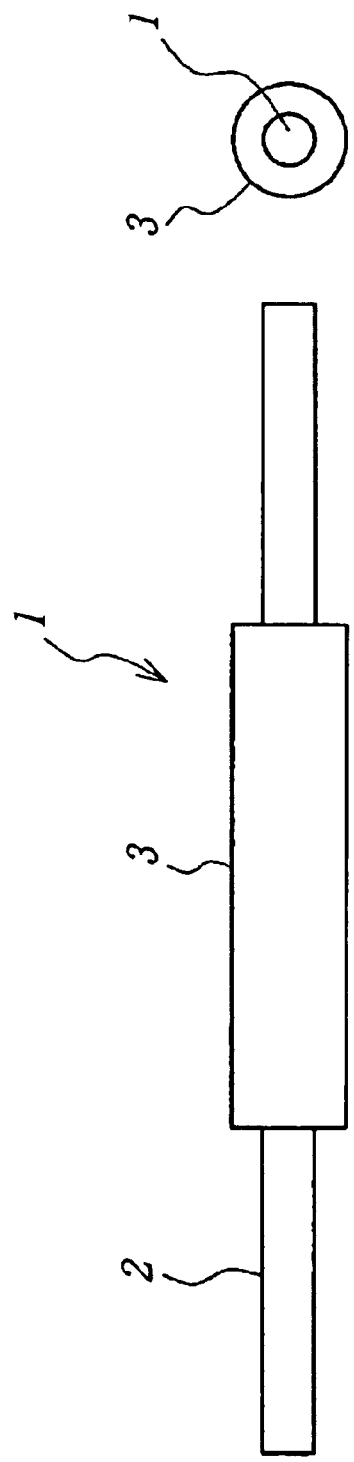
FIG. 1 shows a paper feed roller according to the first aspect of the present invention.

Best Mode for Carrying Out the Invention

In the following, the present invention will be explained. The follow-ing explanation is applied to the paper feed rollers according to the first, second and third aspects of the present invention, unless otherwise described.

1. Paper Feed Roller (1-1) Rotary Shaft

The same rotary shafts as in the conventionally paper feed roller are used as those in the paper feed rollers according to the first and second aspects of the present invention. As the shape thereof, a rotary shaft may be recited in which a bearing-fitting portion or a driving force transmission mechanism-fitting portion is provided by cutting and finish working at a shaft for supporting the cylindrical portion functioning as a paper feeding section. As a material for the rotary shaft, an ordinary material, for example, SUM free cutting steel or the like may be recited. The surface of the SUM free cutting steel may be electroless plating with Ni—P.

The rotary shaft to be used in the paper feed roller according to the third aspect of the present invention is constituted by the two divided type rotary shaft portions which are inserted and integrated into the central portions of the opposite end faces of the cylindrical roller portion axially inwardly from the opposite sides, respectively. Except that the rotary shaft is constituted by the two divided type rotary shaft portions, the same material as in the rotary shaft in the conventional paper feed roller is used. How to insert and fix the rotary shaft portion into the hole provided at the end face of the cylindrical roller portion will be explained in the following explanation of the cylindrical roller portion in detail.

(1-2) Cylindrical Roller Portion

The cylindrical roller portion is produced by pressing the mixture composed of the hydraulic composition to obtain a cylindrical shaped body, and curing and hardening the cylindrical molded body. The thickness of the cylindrical roller portion is determined by the outer diameter of the rotary shaft and the desired paper feed roller. Although a tolerance of the diameter of the cylindrical portion is set at a given numerical value in design, which is ordinarily set at a working accuracy of a desired outer diameter ±0.003 mm. In order to further reduce slippage between the cylindrical roller and the paper, the surface of the cylindrical roller may be coated with a ceramic grain-mixed thermosetting resin, followed by curing. The surface of the cylindrical roller portion itself may be finished coarse by sand blasting or the like.

In the paper feed roller according to the second aspect of the present invention, it is preferable that the connecting end portions of the cylindrical molded bodies to be connected together have respectively interengaging shapes, and the cylindrical molded portions are connected to each other at these end portions. By so doing, the adjacent cylindrical molded bodies are more firmly connected together, so that the integrity of the roller portion formed from the cylindrical molded bodies is more firmly maintained.

The engagement is preferably effected by a structure in which a cylindrical projection and a cylindrical recess are provided at the connecting end portions of the cylindrical molded bodies to be connected to each other, respectively, so that they may be engaged with each other in a telescopic manner. Circumferential sliding between the cylindrical molded bodies can be prevented by the provision of a groove and a projection to be engaged in a spline fashion at the outer peripheral surface of the cylindrical projection and the inner peripheral surface of the cylindrical portion, respectively.

Further, circumferential sliding between the cylindrical molded bodies can be also prevented by adopting an engaging structure in which the outer peripheral surface and the inner peripheral surface of the corresponding cylindrical projection and cylindrical recess, respectively, are of a polygonal shape. Further, a recess is provided at the inner peripheral surface of each of the cylindrical molded bodies to be connected to each other, and the cylindrical molded bodies are connected together via the connecting member engaging over such recesses.

In the paper feed roller according to the third aspect of the present invention, the rotary shaft is inserted and fixed into the cylindrical roller in the following manner.

(a) A hole is formed in a central portion of each end face of the cylindrical molded body or the cylindrical roller portion such that the hole is concentric with the outer peripheral surface of the cylindrical roller portion, and the rotary shaft portions are fitted and fixed into the holes at the end portions. The inner diameter of the hole is slightly smaller than the outer diameter of the rotary shaft portion so that the rotary shaft portion may be inserted and fixed into the hole of the cylindrical roller portion through shrinkage fitting, expansion fitting or press fitting.

(b) A female screw is threaded at the inner peripheral surface of the hole of the cylindrical roller portion, a male screw is threaded at the outer peripheral surface of the corresponding rotary shaft portion, and the rotary shaft portion is inserted and fixed into the hole of the cylindrical roller portion by screwing.

(c) A screw portion is formed at one end portion of the rotary shaft portion, and screwed into an end portion of the cylindrical molded body or the cylindrical roller portion to attach the rotary shat portion thereto.

In a preferred embodiment of the paper feed roller according to the present invention, a plurality of cylindrical molded bodies are each obtained by molding the hydraulic composition and releasing the molded body, and the adjacent cylindrical molded bodies are connected before or after the cylindrical molded bodies are cured and hardened, thereby forming the cylindrical roller portion. In this case, the accuracy(deviation accuracy) of the thus obtained cylindrical roller portion can be made at a high accuracy even as it is, but the circularity of the cylindrical roller portion can be enhanced by centerless grinding. When the rotary shaft portions are attached and fixed to the end portions, respectively, of the cylindrical roller portion having the circularity enhanced in such a manner that the center of the rotary shaft portions is aligned with the center of the cylindrical roller portion, the high accuracy paper feed roller is consequently obtained.

The hole of the insertion of the rotary shaft may be formed during the press molding the cylindrical molded body. In order to realize a more accurate roller, it is preferable that after the circularity of the cylindrical roller portion is enhanced by centerless grinding, the hole is formed with reference to the outer diameter of the cylindrical roller portion by a fine lathe or the like.

2. Mixture Composed of the Hydraulic Composition

The mixture composed of the hydraulic composition used in the present invention comprises the hydraulic composition obtained by mixing a hydraulic powder, a non-hydraulicity powder and a workability improver, and other additive to be added if necessary, and water to be contained if necessary.

(2-1)

The hydraulic powder used in the present invention means a powder to be cured with water for example, a calcium silicate compound powder, a calcium aluminate compound powder, a calcium fluoroaluminate compound powder, a calciun sulfaminate compound powder, calcium aluminofferrite compound powder, a calcium phosphate compound powder, hemihydrate or anhydrous gypsum powder, a self-hardening lime powder and a mixed powder of any two or more kinds of these powders may be recited.

As to the grain distribution of the hydraulic powder, the Blaine's specific surface area specific surface area is preferably not less than 2500 cm$^2$/g from the standpoint of ensuring the hydraulic property regarding the strength of the molded body. The compounding percentage of the hydraulic powder is 50 to 90 wt %, preferably 65 to 75 wt %, provided that the total of the hydraulic powder and the non-hydraulic powder is 100 wt %. If the compounding amount is less than 50 wt %, the strength and the filling percentage decrease, whereas if it is more than 90 wt %, the filling percentage in obtaining the molded body decreases. Both cases are undesirable, because the molded body cannot withstand the working stress during the mechanical working.

(2-2) Non-hydraulic Powder

The non-hydraulic powder means a powder which will not be cured even upon contact between water and it alone. The non-hydraulic powder includes powders which are alkaline or acidic or each form a reaction product with other dissolved ingredient through dissolution of that therefrom. As typical examples of the non-hydraulic powder, mention may be made of calcium hydroxide, gypsum dehydrate powder, calcium carbonate powder, slag powder, fly ash powder, silica powder, and silica tume powder. The average particle size of the non-hydraulic powder is smaller than that of the hydraulic powder by an order of one or more digits, preferably two or more digits. The lower limit of the fineness of the non-hydraulic powder is not particularly set so long as the effects of the present invention is not harmed.

The compounding amount of the non-hydraulic powder is set at 10 to 50 wt %, preferably 25 to 35 wt % relative to the mixed powder of the hydraulic powder and the non-hydraulic powder. If the compounding amount is less than 10 wt %, the strength and the filling percentage decrease, whereas if it is more than 50 wt %, the filling percentage in obtaining the molded body decreases. Both cases are undesirable, because they adversely affect various physical properties after molding and hardening, for example chipping during mechanical working and dimensional stability. In considering the mechanical workability, etc., it is preferable to adjust the compounding amount of the non-hydraulic powder so that the filling percentage may not too decrease.

It is possible to increase the filling percentage in forming the molded body and decrease the void percentage of the resulting molded body through addition of the non-hydraulic powder. This can enhance the dimensional stability of the molded body.

(2-3) Workability Improver

The workability improver means a material that improves moldability, mold-releasability, cutting/grinding workability and grinding accuracy of the molded body obtained from the hydraulic composition, particularly has properties to contribute to improvement of the cutting/grinding workability and grinding accuracy. That is, since the workability improver added functions as a molding aid during the press molding, the mixture including the hydraulic composition improves the moldability. That is, the workability improver makes the mixture composed of non-flowing curable composition to be uniformly filled and uniformly pressed. Further, the workability improver improves brittleness of the cement-based hydraulic body, so that the molded body is released from the mold during the releasing step without being damaged at all, resulting in improvement of the workability. In general, the molded body obtained from the hydraulic composition exhibits a cut state of a "crack-type" mechanism in cutting. In this case, problems occurs that the material is broken or chipped (including microscopical phenomena).

Since the hydraulic composition in the present invention contains the workability improver, it is possible to prevent cracking and chipping of the above material to which toughness is imparted to exhibit the mechanical workability in the molded body as a solid material. That is, the workability of the molded body obtained from the hydraulic composition which has been difficult to effect mechanical workings such as cutting, grinding, etc. can be improved to the same level as that of the metallic materials with the workability improver. The molded body can be cut with the lather or the like and ground with a cylindrical grinder or the like as in the same manner as in the metallic materials. The molded body can be finely worked within an order of $\mu$m relative to a desired dimension.

The compounding amount of the workability improver is set at 2 to 18 parts by weight, preferably 5 to 15 parts by weight, relative to 100 parts by weight of the mixed powder of the hydraulic powder and the non-hydraulic powder. The compounding amount of less than 2 parts by weight is not preferable, because cuttability degrades. If it is more than 18 parts by weight, both the grinding accuracy and the dimensional stability after the grinding degrade. The grain size is generally that discrete grains are in a diameter range of not more than 1 $\mu$m.

As the workability improver, use may be made of a powder or an emulsion of at least one kind of resins selected from a vinyl acetate resin, a copolymer resin with vinyl acetate, acrylic resin or a copolymer with acryl, a styrene resin or a copolymer with styrene, and an epoxy resin. As the above vinyl acetate copolymer resin, a vinyl acetate-acryl copolymer resin, a vinyl acetate-beova copolymer resin, a vinyl acetate-beova terpolymer resin, a vinyl acetate-maleate copolymer resin, a vinyl acetatebylene copolymer resin, a vinyl acetate-ethylene-vinyl chloride copolymer resin, etc. may be recited. As the acrylic copolymer resin, an acryl-styrene copolymer resin, an acryl-silicone copolymer resin, etc. may be recited. As the styrene copolymer resin, a styrene-butadiene copolymer resin may be recited.

(2-4) Other Additives

In addition to the above indispensable ingredients (2-1) to (2-3), the mixture comprising the hydraulic composition in the present invention may contain an aggregate, such as silica sand, as a bulk filler, at such a rate that the aggregate is 10 to 50 parts by weight, preferably 20 to 30 parts by weight relative to 100 parts by weight of the mixture of the hydraulic powder and the water non-hydraulic powder. In order to further improve the moldability, a known ceramic molding aid may be added at a rate of 1 to 10 parts by weight, preferably 3 to 6 parts by weight relative to 100 parts by weight of the mixed powder. Further, in order to suppress the dimensional change due to the shrinkage of the material during hardening, a water repellant to decrease absorption of water, such as silicone oil, may be added at a rate of 0.5 to 5 parts by weight, preferably 1 to 2 parts by weight relative to 100 parts by weight of the mixed powder.

3. Method for Producing the Paper Feed Rollers (3-1) Formation of a Cylindrical Molded Body A cylindrical molded body of a given length and a given outer diameter with a hole in its central portion through which a rotary shaft is to be passed is molded from a given hydraulic composition. If the cylindrical roller portion is to be formed by axially connecting a plurality of the cylindrical molded bodies, the length of one cylindrical molded body is determined from the relationship between the dimension of papers and the number of the cylindrical molded bodies to be connected to produce the paper feed roller. In this case, the cylindrical molded bodies to be connected may be molded such that their connecting end portions have interengageable shapes so that the cylindrical molded bodies can be connected by engagement at these end portions.

According to the paper feed roller of the third aspect of the present invention, a cylindrical molded body may be formed in central portion of opposite end faces with holes for attaching and fixing rotary shaft portions constituting a rotary shaft such that the holes are concentric with the outer peripheral surface of the cylindrical molded body. Further, when the cylindrical roller portion is constituted by axially connecting plural cylindrical molded bodies and the cylindrical molded bodies are connected via a connecting rod, it may be that the cylindrical molded bodies other than those to be located at the opposite ends are tubular cylindrical molded bodies, and that the cylindrical molded bodies to be located at the opposite ends are provided at their axially inner end portions with holes to which end portions of the connecting rod are to be fitted.

In order to formulate a molding mixture by using the hydraulic composition in the present invention, the molding mixture is obtained by mixing the hydraulic composition, other additive to be added if necessary, and water in an amount of not less than 30 parts by weight and not less than 25 parts by weight relative to 100 parts by weight of the mixture of the hydraulic powder and the non-hydraulic mixture.

If the amount of water incorporated exceeds 30 parts by weight, it adversely affects grindability, grinding accuracy, and drying accuracy. It is effective to make water as less as possible so as to reduce drying shrinkage. When water necessary for hydration can be fed by curing with steam, or when water necessary for hydration is incorporated through mixing the workability improver in the form of an emulsion, water may be omitted as the case may be.

The mixing method is not particularly limited Preferably, a mixing method or a mixer is preferred, which can afford powerful shearing stress upon the mixture. Since the average particle diameter of the non-hydraulic powder is smaller than that of the hydraulic powder by an order of not less than one order, a time required for mixing will be very longer to obtain a uniform mixture unless the shearing mixer is used.

Further, in order to make the handling of the mixture better in molding, the mixture may be granulated to a size suitable for a shape to be molded, following the mixing. The granulation may be effected by using a known method such as rolling granulation, compression granulation, stirring granulation or the like.

After the thus obtained molding mixture is filled between a shaft core and an outer frame, which is pressed by hydrostatics press, multi-axial press or uniaxial press. Although the pressing pressure is preferably as high as possible to approach a theoretical density calculated as much as possible. The lower limit in the pressing condition largely differs depending upon molding easiness of the mixture, the content and the rate of water and the required dimensional accuracy.

(3-2) Rotary Shaft

The outer diameter of a portion of the rotary shaft around which the cylindrical molded body is to be fitted is smaller than the inner diameter of the cylindrical molded body by about 10 to 50 $\mu$m, preferably 10 to 30 $\mu$m. If it is less than 10 $\mu$m, it is difficult to assemble the cylindrical molded body around the rotary shaft, whereas if it is more than 50 $\mu$m, the concentricity (deviation from concentricity) between the rotary shaft and the cylindrical molded body becomes larger to degrade the accuracy of the roller. If it is not more than 30 $\mu$m, it is possible to assemble the cylindrical molded body around the rotary shaft due to the shrinkage of the cylindrical molded body following hardening thereof. If a given number of cylindrical molded bodies are to be assembled around the rotary shaft, the rotary shaft is formed from a material in such a length as to expose outside beraing-attaching portions or driving force transmission mechanism-attaching portions at opposite end portions thereof.

The rotary shaft of the paper feed roller according to the third aspect of the present invention is constituted by two rotary shaft portions concentrically aligned, inserted and fixed into the holes which are provided at the central portions of the opposite end faces of the cylindrical roller portion in such a manner that the holes are concentric with the outer peripheral surface of the cylindrical roller portion. The whole length of each of the rotary shaft portions, the length of an inserting portion thereof and the length of an outwardly exposed portion thereof are appropriately determined. As mentioned above, if the screw fitting is effected for the hole of the end face of the cylindrical roller portion, a male screw is provided at an outer peripheral surface of the inserting portion of the rotary shaft portion. Further, if the rotary shaft portion is attached to the cylindrical molded body with an adhesive or the like, the outer diameter of the rotary shaft portion to be attached to the cylindrical molded body is smaller than the inner diameter of the hole of the cylindrical molded body by about 10 to 50 $\mu$m, preferably 10 to 30 $\mu$m. If it is less than 10 $\mu$m, it is difficult to assemble the cylindrical molded body to the rotary shaft, whereas if it is more than 50 $\mu$m, the concentricity (deviation from the concentricity) between the rotary shaft and the cylindrical molded body becomes larger, resulting in poor accuracy of the roller. If it is less than 30 $\mu$m, the cylindrical molded body can be attached to the rotary shaft due to shrinkage following the hardening of the cylindrical molded body without using adhesive in combination.

(3-3) Connecting Core Rod

If the cylindrical roller portion is made by axially connecting a plurality of the cylindrical molded bodies to each other, a connecting core rod connects at least one set of the adjacent cylindrical molded bodies. In this case, it is preferably to connect all of said plurality of the cylindrical molded bodies with a single connecting core rod. By so doing, the cylindrical molded bodies are firmly integrated. The relationship between the outer diameter of the connecting core rod and the inner diameter of the cylindrical molded bodies is preferably such that the outer diameter of the connecting core rod is smaller than the inner diameter of the inner cylindrical molded bodies by about 30 $\mu$m in the case that the cylindrical molded bodies are connected with the connecting core rod, and cured and hardened to form the cylindrical roller portion. If it is not more than 30 $\mu$m, the cylindrical molded bodies can be fixed around the connecting core rod due to the shrinkage following the hardening of the cylindrical molded bodies without using adhesive.

When the cylindrical molded bodies are fixed with the connecting core rod after curing and hardening, the connecting core rod is preferably smaller by about 10 to 50 $\mu$m. If it is less than 10 $\mu$m, it is difficult to fix the cylindrical molded bodies to the connecting core rod, whereas if it is more than 50 $\mu$m, the concentricity (deviation from the concentricity) between the connected cylindrical molded bodies and the rotary shaft is large, resulting m poor accuracy of the roller.

In order to enhance the rigidity (deflection resistance) of the cylindrical roller portion, it is preferable to increase the diameter of the connecting core rod. If the diameter of the core rod is increased to 1.5 times, the warped amount is reduced by 50%.

(3-4) Assembling the Cylindrical Molded Bodies to the Rotary Shaft (3-4-1) First Method The paper feed roller according to the first aspect of the present invention is produced by forming a cylindrical molded body around a rotary shaft That is, a mixture is formulated from a hydraulic composition powder, and filled in a cylindrical mold around a rotary shaft placed upright therein, and the filled mixture of the hydraulic composition is molded to a given hardness with a pressurizing piston under application of pressure. Thereafter, the molded body is removed and released from the cylindrical mold together with the rotary shaft After the molded body is released from the cylindrical mold, it is cured in autoclave.

After curing, in order to prevent dimensional change, such as shrinkage, through hydration reaction, dewatering, etc. of the cured molded body after cutting and grinding, the cured molded body is sufficiently dried before working, and if necessary, the surface of the cylindrical molded body is worked with a lather, and ground with a centerless grinder. Moreover, the surface of the cylindrical molded body is coated with a thermosetting resin containing abrasive grains, if necessary.

(3-4-2) Second Method

After the cylindrical molded body having a hole in a central portion is formed by forming a cylindrical green molded body having a hole in a central portion with the hydraulic composition, curing and hardening the molded body, and the cylindrical roller portion is assembled integrally around the outer peripheral surface of the rotary shaft by inserting the rotary shaft into the hole of the cylindrical molded body up to a given location. When the cylindrical roller portion is formed by a plurality of cylindrical molded bodies, each cylindrical green molded body is formed through releasing, curing and hardening, the rotary shaft is passed through the holes of the plural cylindrical molded bodies at a given location, while the adjacent cylindrical molded bodies are connected. Thereby, the cylindrical roller portion is integrally assembled around the outer peripheral surface of the rotary shaft. The paper feed roller according to the third aspect of the present invention is the same as described above except that the rotary shaft portions are attached to the opposite end portions of the cylindrical roller portion and that the connecting rod is used.

After press molding, the cylindrical molded body taken out from the mold can be cured and hardened by one of ordinary temperature curing, ordinary pressure vapor curing, autoclave curing, etc. or a combination thereof. In view of the mass production, chemical stability of the products, dimensional stability, etc., the autoclave curing is preferred. The autoclave curing for about 5 to 10 hours completely terminates the hardening reaction of the cylindrical molded body, which makes the subsequent dimensional change extremely small. The autoclave curing causes a shrinkage of the cylindrical molded body in a range of 0.08 to 0.15% of the dimension thereof (this depends upon the compounding condition). Therefore, the inner diameter portion of the cylindrical molded body is formed taking the shrinkage amount into consideration. At least 10 $\mu$m or more clearance is necessary to attach the cylindrical molded body to the rotary shaft after curing and hardening. Since the cylindrical molded body does not shrink after curing in the autoclave, the cylindrical molded body can be attached to the rotary shaft with the adhesive or by assuring a attachable clearance through cooling the rotary shaft or warming the cylindrical molded body.

As the adhesive used, an epoxy-based resin, an urethane-based adhesive, an emulsion-based adhesive, a synthetic rubber-based adhesive, an acrylate-based adhesive or the like may be used.

(3-4-3) Third Method

According to another method for producing the paper feed roller in the present invention, a cylindrical green molded body a hole in a central portion is molded from the hydraulic composition, and the cylindrical green molded body having the hole in a central portion is obtained by releasing. The rotary shaft is inserted into the hole of the cylindrical green molded body up to a given position. In this case, the cylindrical green molded body is formed as having such strength that it may not be broken during the step of inserting the rotary shaft into the central portion of the cylindrical green molded body. When the cylindrical roller portion I to be formed by a plurality of cylindrical molded bodies, each of the cylindrical molded body is molded and released, the rotary shaft is inserted through the plural cylindrical green molded bodies up to a given location, while the adjacent cylindrical molded bodies are connected. The cylindrical molded body is formed by curing and hardening the cylindrical green shaped bodies inserted around the outer periphery of the rotary shaft, so that the cylindrical roller portion is integrally formed around the outer peripheral surface of the rotary shaft.

The paper feed roller according to the third aspect of the present invention is the same as described above, except that the rotary shaft portions are attached to the opposite end portions of the cylindrical roller portion and that the connection rod is used as the case may be.

(3-5) Curing, Hardening

Since a few hours to several days are required for the molded body to exhibit sufficient strength from a time of releasing it from the mold after press molding, curing is necessary. Although the molded body may be left at room temperature or cured in water or vapor as it is. The molded body is preferably cured in autoclave. If the molded body lacks or is short of water to obtain a hardened body, vapor curing is preferable. Particularly, the molded body is preferably cured in the autoclave. The autoclave curing is effected at not less than 165° C. under saturated vapor pressure of 7.15 kg/cm$^2$ or more, and preferably the saturated vapor pressure of 9.10 kg/cm$^2$ or more is preferable. The curing time, which varies depending upon the curing temperature, is 5 to 15 hours at 175° C. After press molding, the molded body exhibits compression strength of around 5 N/mm$^2$ before starting the autoclave curing after press molding. Unless sufficient strength is exhibited until the autoclave curing, the molded body is explosively broken.

FIG. 1 shows an embodiment of the paper feed roller according to the first aspect of the present invention. The paper feed roller 1 includes a support/drive rotary shaft 2 and a cylindrical roller portion 3 made of the hydraulic composition. The cylindrical roller portion 3 is integrated around the outer periphery of the rotary shaft 2. The outer diameter of the cylindrical roller portion is worked to an accuracy of $\mu$m order relative to a desired outer diameter by cutting or the like. In the following, the method for producing the paper feed roller according to the present invention will be explained with reference to FIG. 2.

Figure 2:
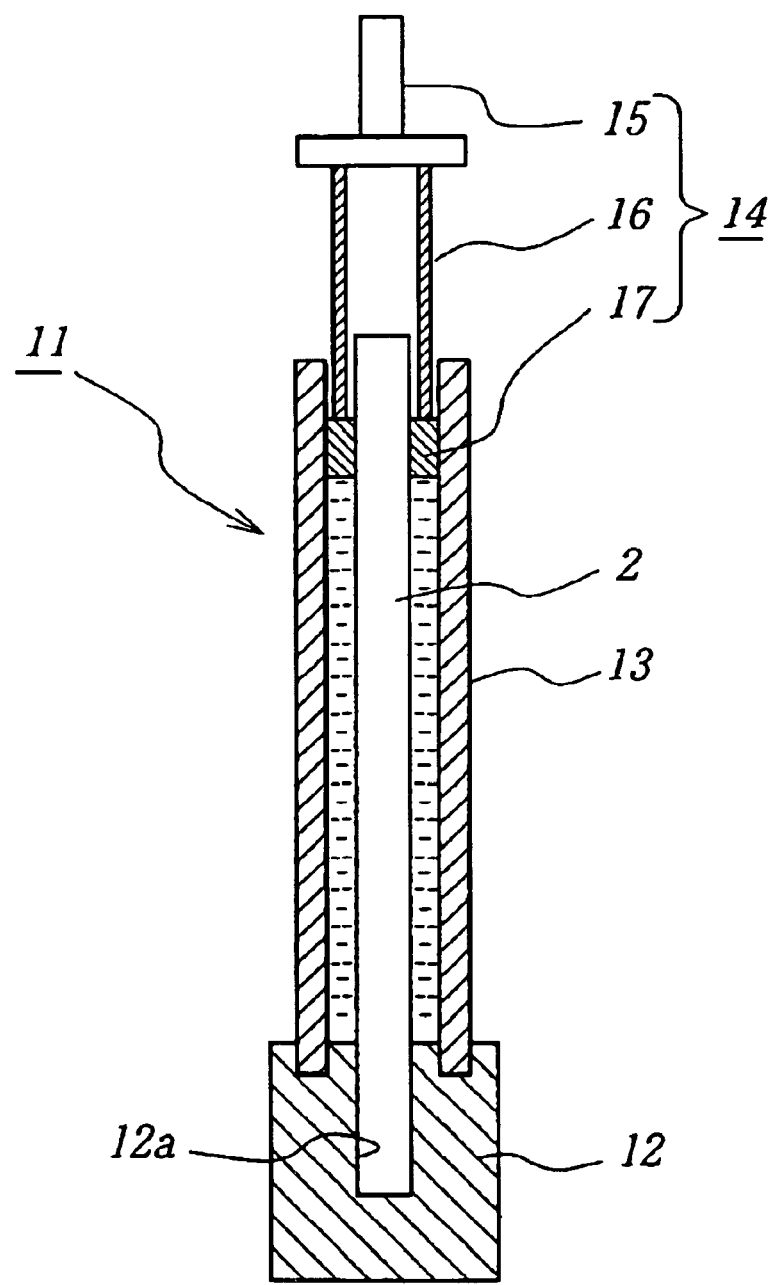
FIG. 2 shows a molding apparatus and a method for producing the paper feed roller according to the first aspect of the present invention.

FIG. 2 shows a molding apparatus 11 for producing the above paper feed roller. The paper feed roller molding apparatus 11 comprises a base 12, a cylindrical hollow mold 13 erected on the base 12 and a push rod unit 14. The push rod unit 14 includes an oil hydraulic cylinder. 15, a push rod 16 connected to a lower portion of the oil hydraulic cylinder 15, and an annular pressure piston 17 attached to the lower end of the push rod 16.

In producing the paper feed roller, a rotary shaft 2 is placed upright inside the cylindrical mold 13, while its lower end is inserted in a recess 12a provided in a central portion of the base 12. In this state, the annular press piston 17 of the push rod is arranged slidable and closely relative to the outer peripheral surface of the rotary shaft 2 and the inner peripheral surface of the cylindrical mold 13.

The mixture composed of the hydraulic composition formulated as the molding composition by the above formulating method is prepared, and a molded body is produced by the following method. The granular molding material is filled around the rotary shaft 2 inside the cylindrical mold 13, and is molded at ordinary temperature under pressure with the push rod unit for a given holding time. Thereafter, after the push rod unit is removed, the rotary shaft and the cylindrical roller portion integrated together are removed from the base and the cylindrical mold. Since the hydraulic composition requires a few hours to several days to exhibit sufficient strength, the molded body having been removed from the cylindrical mold I is cured.

Instead of simultaneously molding the molded body from the cylindrical hydraulic composition in the presence of the rotary shaft, the paper feed roller may be produced by other method, for example, the hydraulic composition is molded in a cylindrical shape, the molded body is released and cured, and then the rotary shaft is inserted and fixed into the hole of the molded body, or alternatively the hydraulic composition is molded, and the molded body is released, the rotary shaft is inserted into the hole of the molded body, and the molded body is cured and hardened, and fixed to the rotary shaft. In this case, it is also possible to produce a roller by inserting, arranging and fixing a plurality of molded bodies around the rotary shaft in such a manner that the molded bodies are axially spaced or approached. In fixing, adhesive may be used as the case may be.

The cylindrical molded body can be formed by the above press molding method, but uniaxial press molding is most preferable due to the simplest structure for lost-cost mass production.

The above curing methods may be used, but curing in the autoclave is preferable. After sufficient strength appears following the curing, the cylindrical roller portion made of the hydraulic composition is surface-grindded with a general metal grinder such as a centerless grinder or a cylindrical grinder. By so doing, sufficient accuracy can be assured for the paper feed roller.

Embodiments

Embodiments according to the first aspect of the present invention will be explained.

EXAMPLES 1 TO 4

A paper feed roller having a structure shown in FIG. 1 was produced by using the molding apparatus shown in FIG. 2. A hydraulic composition powder included 70 parts by weight of Portland cement as a hydraulic powder, 30 parts by weight of pyrogenic silica fume as a non-hydraulic powder, and an acrylic resin as a workability improver in a amount shown in Table 1. Into the above hydraulic composition were added and mixed 20 to 30 parts by weight of water and 30 parts by weight of silica No. 8 as a filler, and the mixture was molded around the outer periphery of the rotary shaft placed upright on the base 12 within the cylindrical mold 13 under pressure with the pressure piston 17. After the molded body reached a given hardness, the molded body was removed from the mold 13 together with the rotary shaft 2. After being removed from the mold 13, it was cured in autoclave.

After curing, the cured molded body was sufficiently dried so that dimensional change, such as shrinkage, due to hydration reaction and dehydration of the cured molded body after cutting and grinding. After drying, the surface of the cylindrical molded body was worked with lather, then ground with a centerless grinder, and finally the surface of the cylindrical molded body was coated with a thermosetting resin containing sand grains.

Various workabilities were compared and evaluated according to following standards with respect to the above workings.

(1) Moldability

As to the moldability, molding easiness was judged according to pressure and compacted degree necessary for pressing.

(2) Mold-Releasability

As to the mold-releasability, mold-releasing easiness was compared based on force by which the molded body was removed from the mold.

(3) Grindability

As to grindability, grinding easiness was compared based on the time for grinding the same amount with reference to that of SUS free cutting steel.

(4) Grinding Accuracy

As to grinding accuracy, the circularity degrees of the ground rollers were compared.

TABLE 1

| | Portland cement | Pyrogenic silica | Acrylic resin | Water | Aggregate (No.8 silica) | Mold-ability | Mold releasability | Grindability | Grinding accuracy |
|---|---|---|---|---|---|---|---|---|---|
| | | | | | unit: part by weight | | | | |
| Comparative Example 1 | 70 | 30 | 0 | 20 | 30 | X | X | X | X |
| Example 1 | 70 | 30 | 2.5 | 22.5 | 22.5 | ○ | ○ | ○ | ○ |
| Example 2 | 70 | 30 | 2.5 | 25 | 35 | ◎ | ◎ | ○ | ◎ |
| Example 3 | 70 | 30 | 15 | 25 | 25 | ◎ | ◎ | ◎ | ◎ |
| Comparative Example 2 | 70 | 30 | 20 | 30 | 30 | ○ | ◎ | ◎ | X |

In Table, ⊚, ○ and x mean the following.

(1) Moldability (Under Press Pressure of 1000 kg/cm$^2$)

A percentage of a density at the time of molding relative to a theoretical density obtained by calculation was evaluated as follows.

⊚ . . . 95% or more

○ . . . 90 to 95% x . . . less than 90%

(2) Mold Releasability

A pressing force when a molded body was pulled out from a cylindrical mold was evaluated as follows.

⊚ . . . less than 500 kg

○ . . . 500 to 1000 kg.

x . . . more than 1000 kg (3) Grinding Characteristic

A ground amount of a molded body per unit time period was evaluated, while that of SUM free cutting steel being taken as 100%.

⊚ . . . more than 95% (100% or more included)

○ . . . 90–95% x . . . less than 90%

(4) Grinding Accuracy

⊚ . . . less than ±0.002 as a tolerance in diameter

○ . . . ±0.002 to ±0.005 as a tolerance in diameter x . . . more than ±0.005 as a tolerance Thee kinds of materials were ground by using a metal-grinding stone. Centerless grinding speed and grinding accuracy (circularity) were compared with respect to a SUM free cutting steel, an alumina sintered body and an invention product, and shown in Table 2.

It is seen that the invention products have workability and finish accuracy equivalent to those of the metallic materials owing to the incorporation of the workability improver thereto, and that the invention products are suitable for inexpensive mass production.

TABLE 2

|  | Working speed | Grinding accuracy (outer diameter: 22 mm) | Remarks |
| --- | --- | --- | --- |
| SUM free cutting steel | 1500 mm/min | ±0.002 mm | Comparative Example 3 (standard) |
| Alumina sintered body | 120 mm/min | ±0.002 mm | Comparative Example 4 |
| Invention product | 1650 mm/min | ±0.002 mm | Example 4 |

EXAMPLE 5

Weight and inertia moment of a case where a cylindrical body made of a hydraulic composition in the present invention, 330 mm in length and 5 mm or 10 mm in thickness, was integrated with a central portion of a metal shaft, 12 mm in diameter and 500 mm in length and a case where all was made of a metal with the same dimensions as given above are given in Table 3. Calculations were made on the basis that the specific gravity of the molded body was 2.0, and that of the metal was 7.9.

TABLE 3

|  | Case 1 outer diameter: 22 mm, thickness: 5 mm | | Case 2 outer diameter: 32 mm, thickness: 10 mm | | |
| --- | --- | --- | --- | --- | --- |
|  | weight (g) | inertia moment (kg/cm$^2$) | weight (g) | inertia moment (kg/cm$^2$) | Remarks |
| Present invention A | 617 | 2.711 | 903 | 3.239 | Example 5 |
| Metal alone B | 1128 | 3.119 | 2249 | 5.204 | Comparative Example 5 |
| Reduction rate (1-A/B) | 45% | 13% | 60% | 38% | — |

From the above, it is seen that the power of a motor for driving the paper feed roller can be reduced, various driving gears can be reduced, and the total producing cost for apparatuses using the invention products can be decreased Since the weight and the inert moment are almost the same with respect to Comparative Example 1 in Case 1 and Example 5 in Case 2, the invention product has the workability and the grinding accuracy equivalent to those of the metal. Therefore, the diameter of the roller can be increased to 1.5 times. Thus, the paper-feeding accuracy can be increased to 1.5 times.

In the following, it is explained that increase in roller size enhances the paper feed accuracy.

In order to enhance the paper-feeding accuracy, the following two are considered. That is, To enhance the accuracy in controlling the rotating angle of the roller.

To enhance the dimensional accuracy of the diameter of the roller (that is, to enhance the dimensional accuracy of the outer periphery of the roller).

In the actual technique, a–tolerance is ignorably small as compared with a–tolerance. Therefore, to increase the dimensional accuracy of the roller diameter of the–is examined.

A case where a given volume of papers are to be fed is considered.

This is taken as L, and D and ±d are taken as the diameter of the feed roller and a tolerance of the diameter of the feed roller, respectively. A circumferential difference between the maximum and the minimum when the shaft makes one turn, is $$(D+d)\pi - (D-d)\pi = 2d\pi \quad (a)$$

In order for the roller of D in diameter to feed a feed amount L, the roller must turn by (b).

$$L/\pi D \quad (b)$$

From (a) and (b), as the roller of (D±d) in diameter tuns a paper by a certain amount (L), the maximum and minimum deviation is as follows.

$$2d\pi \times L/\pi D = 2\ dL/D \quad (c)$$

From this, the deviation in paper feeding is in proportion to the tolerance (d) of the diameter of the roller, and in inverse proportion to the diameter (D) of the roller.

As mentioned above, according to the first aspect of the present invention, the paper feed roller having the cylindrical portion made of the hydraulic composition having excellent workability has the characteristics that the roller has workability equivalent to that of metals, and is light and inexpensive. The paper feed roller according to the present invention is lighter as compared with that made of the metal alone, and cheaper with better workability as compared with a roller having a sintered ceramic material. The roller of the invention can be produced at a lower cost. An improved paper feed accuracy and a cost down of a machine into which the roller according to the present invention is assembled can be realized.

FIGS. 3 to 6 show preferred embodiments of the paper feed roller according to the second aspect of the present invention. FIGS. 3(a) to 3(f) show an embodiment of the paper feed roller according to the second aspect of the present invention. FIG. 3(a) shows a cylindrical molded body 21 in a central portion of the paper feed roller sectionally shown in FIGS. 3(d) and 3(e), with a left side view at the left, a front view neighboring on the right, a right side view neighboring on the right, and an A—A line sectional view neighboring on the right as cut and viewed along the A—A line in the front view. FIGS. 3(b) and 3(c) show cylindrical molded bodies 22 and 23 at right and left sides in FIGS. 3(d) and 3(e), respectively, the details being the same as those in FIG. 3(a). Each of the cylindrical molded En bodies is formed from the hydraulic composition, and its length may be 50 to 100 mm, for example.

FIG. 3(e) is a sectional view of a paper feed roller in which the cylindrical molded bodies 21, 22 and 23 are fitted around the outer periphery of the supporting/driving rotary shaft 24, while being integrally connected to each other. The length of the rotary shaft 24 is 250 to 350 mm, for example. The cylindrical molded bodies 21, 22 and 23 are preferably firmly integrated together with an appropriate adhesive, and also preferably the cylindrical molded bodies are firmly integrally fixed to the outer periphery of the rotary shaft with appropriate adhesive. In this case, it may be that after the cylindrical molded bodies 21, 22 and 23 are preliminarily connected and fixed to each other(see FIG. 3(d)), the connected cylindrical molded bodies are fitted and integrally connected around the outer periphery of the supporting/driving rotary shaft 24, or alternatively it may be that the cylindrical molded bodies 21, 22 and 23 are successively fitted and integrally fixed around the outer periphery of the rotary shaft 24. Further, it may be that after the cylindrical molded bodies 21, 22 and 23 are molded, released and cured they are fitted, arranged and mutually integrally connected and fixed around the rotary shaft, or alternatively it may be that immediately after the cylindrical molded bodies are molded and released, they are fitted around the rotary shaft and cured to effect mutual integration, connection and fixing.

The cylindrical molded body 21 is provided with a cylindrical recess 21a at a right inner peripheral face and with a cylindrical projection 21b at a left end portion, so that the recess and the projection fit a cylindrical projection 22a of the cylindrical molded body 22 at a left end portion and a cylindrical recess 23a of the cylindrical molded body 23 at a right inner peripheral face. Each of the inner and outer diameters is identical among the cylindrical molded bodies 21, 22 and 23, so that when the cylindrical molded bodies are mutually connected together, each of the inner peripheral surfaces and the outer peripheral surfaces thereof continue longitudinally in parallel to the rotary shaft, while the central holes are concentric with the outer peripheral surfaces. The above are the same with respect to the other embodiments.

Although not shown, if a cylindrical roller, for example 450 mm, is to be produced, molded bodies each having an effective length of around 90 mm (length of the molded body excluding an engaging recessed portion) are preliminarily produced, and fiber of the molded bodies are fitted and integrally integrated around a rotary shaft FIGS. 4(a) to 4(d) show another embodiment of the paper feed roller according to the present invention. In this embodiment, five cylindrical molded bodies are connected(two cylindrical molded bodies 27 and two cylindrical molded bodies 28 are used), while a combination of inner cylindrical recesses and cylindrical projections at end portions of cylindrical molded bodies is slightly changed from that in FIG. 3. The shapes, etc. are clear with reference to the figure, their explanation is omitted.

FIGS. 5(a) to 5(d) show still another embodiment of the paper feed roller according to the present invention. FIG. 5(a) is a cylindrical molded body 30 in a central portion of the paper feed roller shown in a sectional view of FIG. 5(d), a left side view on the left, a front view neighboring on the right, a right side view further neighboring on the right, and a line A—A sectional view on the right as cut and viewed along the line A—A. FIG. 50,) shows a cylindrical molded body 31 to be used at right and left sides in FIG. 5(d). Recesses 30a are provided at opposite end portions of the cylindrical molded body 30, respectively, and a recess 31a is provided at one end portion of the cylindrical molded body 31. FIG. 5(c) shows a connecting member 32 to connect the cylindrical molded bodies 30 and 31. The outer diameter of the connecting member 32 is almost equal to the inner diameter of the recesses 30a, 31a of the cylindrical molded bodies 30, 31, and the inner diameter of the connecting member is equal to that of the cylindrical molded bodies 30, 31. The connecting member may be formed from the same material as that of the cylindrical molded bodies 30, 31, or may be formed from other appropriate material such as a metal or a ceramic material. FIG. 5(d) shows in section a state in which the cylindrical molded bodies 30, 31, 31 and the connecting member 32 are assembled around a rotary shaft The cylindrical molded bodies 30, 31, 31 and the connecting member 32 are assembled and integrally fitted around the rotary shaft in the same manner as in the embodiment of FIG. 3.

Figure 6:
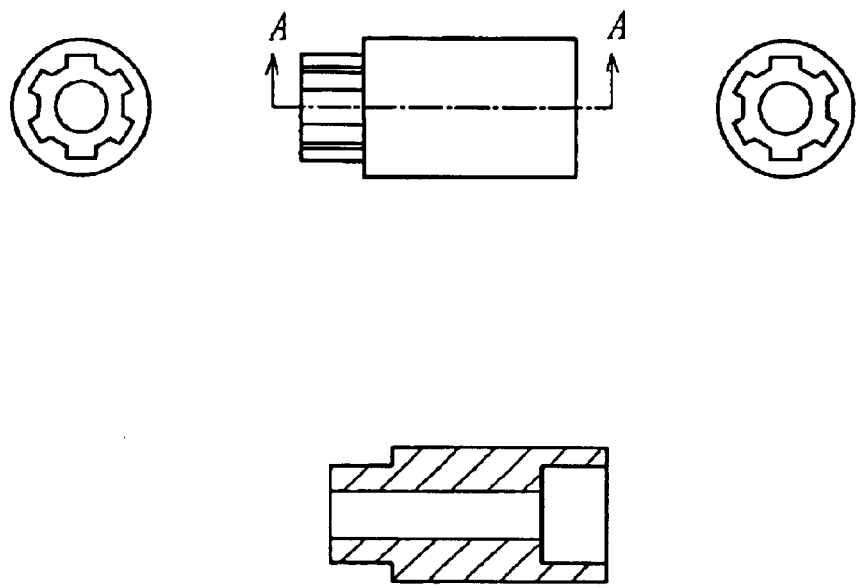
FIG. 6 shows another cylindrical molded body to be used for producing a paper feed roller according to the second aspect of the present invention, with a left side view at the left, a front view neighboring on the right, a right side view neighboring on the right, and an A—A line sectional view neighboring on the right as cut and viewed along the A—A line in the front view.
Figure 7:
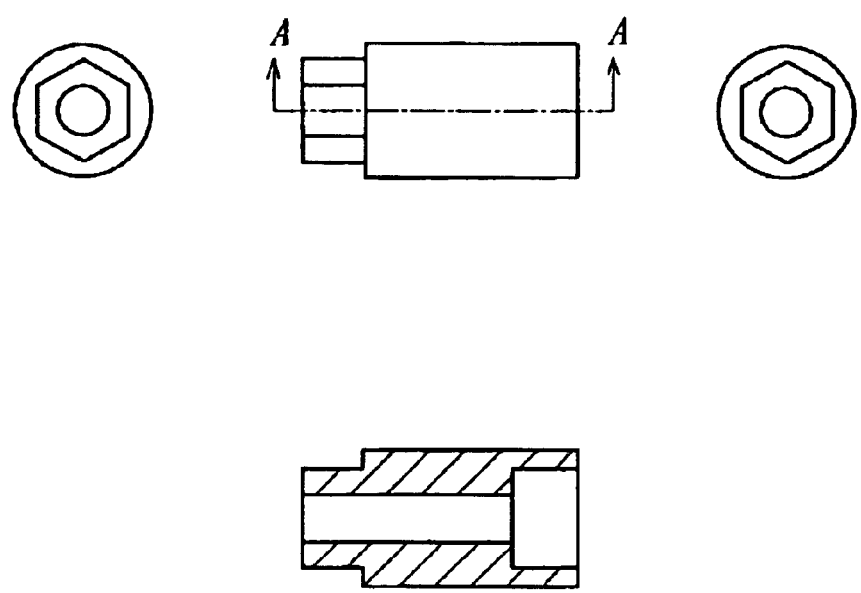
FIG. 7 shows another cylindrical molded body to be used for producing a paper feed roller according to the second aspect of the present invention, with an engaging structure in which the outer peripheral surface of a projection and the inner peripheral surface of a recess of a corresponding cylindrical molded body are of a polygonal shape.

FIG. 6 shows a further embodiment of the cylindrical molded body. This embodiment has a engaging structure of a slit/spline telescopic type to enhance the engaging force between the cylindrical molded bodies connected. FIG. 7 shows an engaging structure in which the outer peripheral surface of a projection of a cylindrical molded body and the inner peripheral surface of a corresponding cylindrical recess of a cylindrical molded body are of a polygonal shape.

EXAMPLES 6 TO 9

Figure 3:
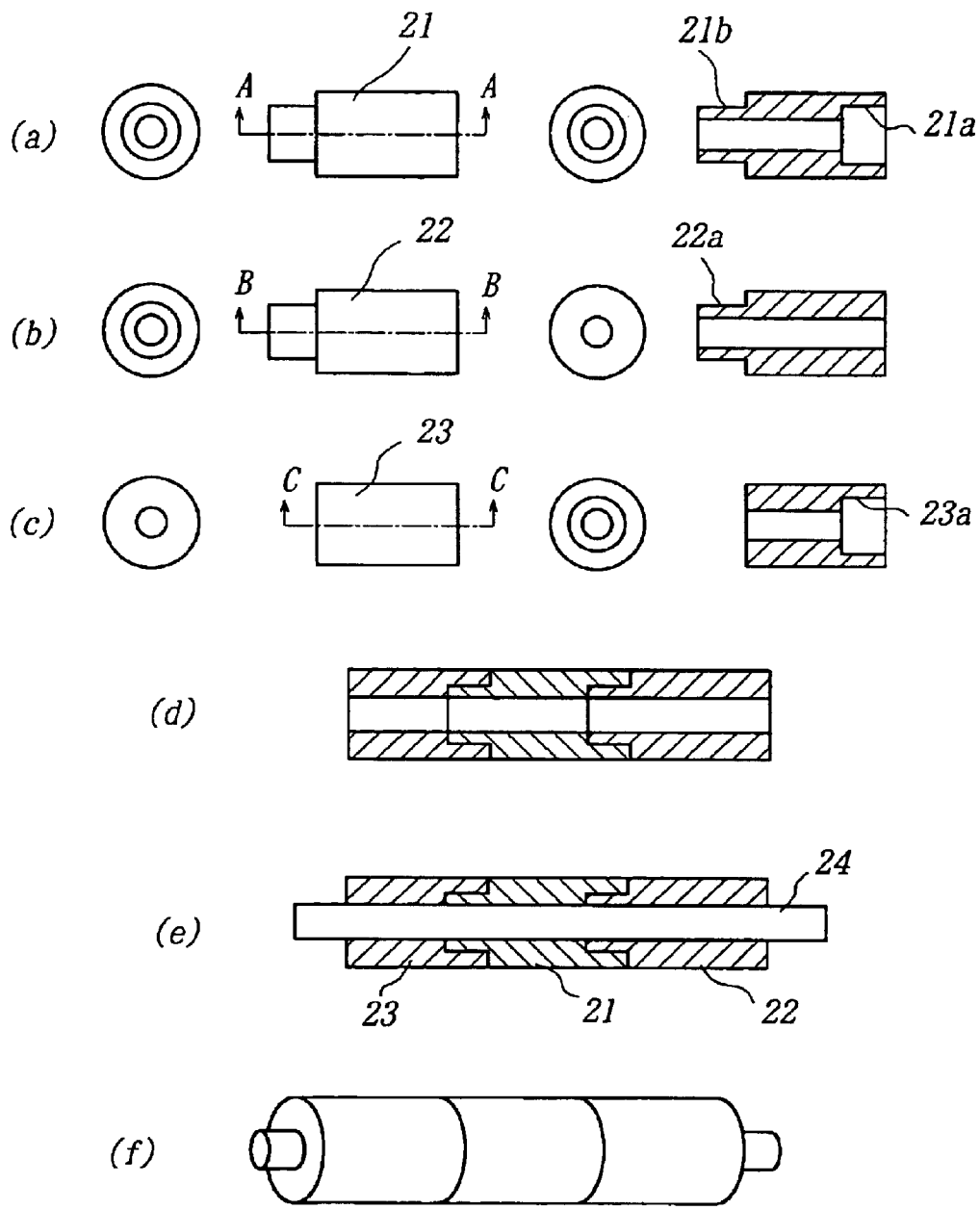
FIG. 3(a) shows a cylindrical molded body 21 in a central potion of a first embodiment of the paper feed roller according to the second aspect of the present invention with a left side view at the left, a front view neighboring on the right, a right side view neighboring on the right, and an A—A line sectional view neighboring on the right as cut and viewed along the A—A line in the front view.
FIG. 3(b) likewise shows a right cylindrical molded body 22 at the right side.
FIG. 3(c) likewise shows a cylindrical molded body 23 at the left side.
FIG. 3(d) is a sectional view of a state in which the cylindrical molded bodies 21, 22 and 23 are connected.
FIG. 3(e) a sectional view of a state in which the cylindrical molded bodies 21,22 and 23 are passed and connected together around and integrally fixedly assembled to the outer peripheral of a rotary shaft 23.
FIG. 3(f) a perspective view of the thus integrally and fixedly assembled paper feed roller.
Figure 4:
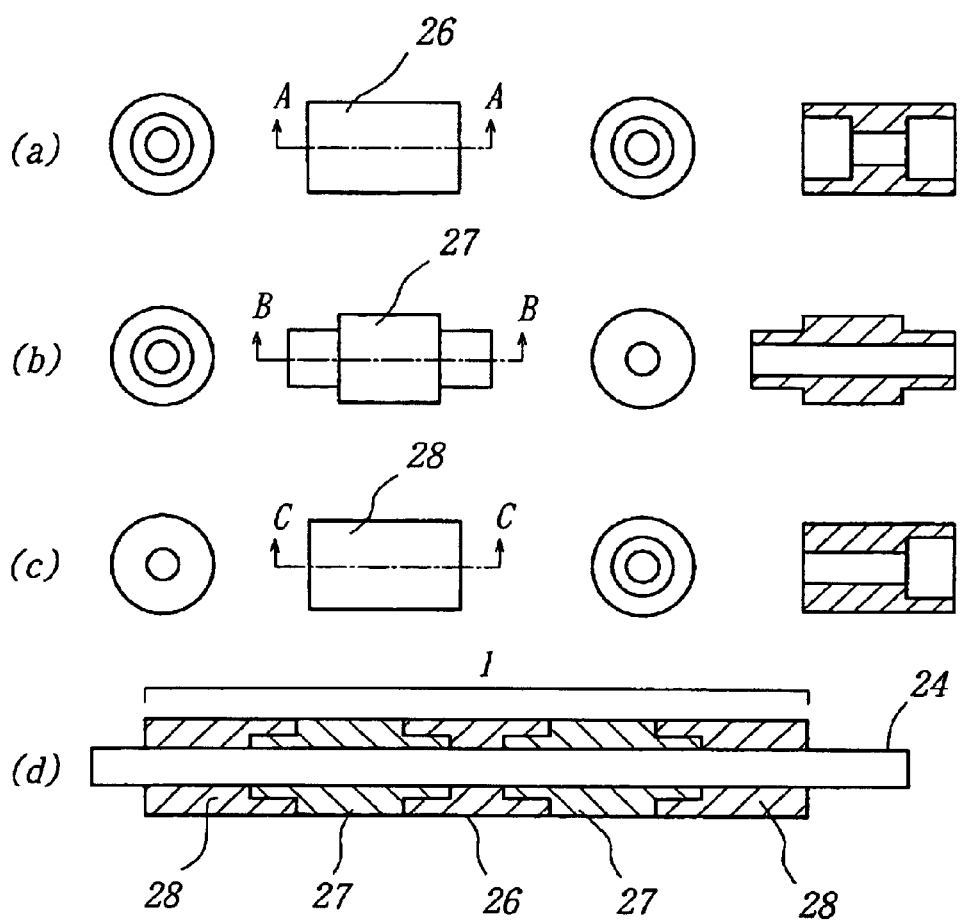
FIG. 4(a) shows a cylindrical molded body 26 in a central portion of a second embodiment of the paper feed roller according to the second aspect of the present invention with a left side view at the left, a front view neighboring on the right, a right side view neighboring on the right, and an A—A line sectional view neighboring on the right as cut and viewed along the A—A line in the front view.
FIG. 4(b) likewise shows a right cylindrical molded body 27 at the right side.
FIG. 4(c) likewise shows a cylindrical molded body 23 at the right and left sides.
FIG. 4(d) is a sectional view of a state in which the cylindrical molded bodies 21, 22 and 23 are passed and connected together around and integrally fixedly assembled to the outer peripheral of a rotary shaft 23.
Figure 5:
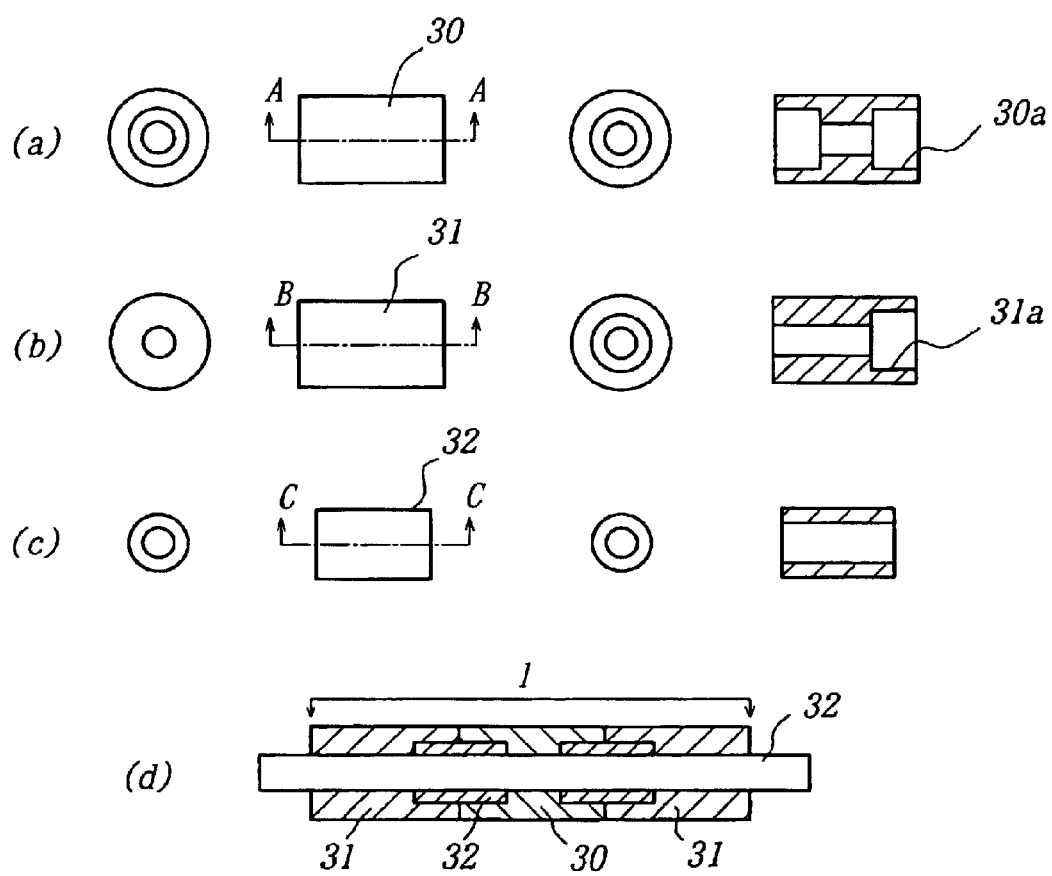
FIG. 5(a) shows a cylindrical molded body 30 in a central portion of another embodiment of the paper feed roller according to the second aspect of the present invention with a left side view at the left, a front view neighboring on the right, a right side view neighboring on the right, and an A—A line sectional view neighboring on the right as cut and viewed along the A—A line in the front view.
FIG. 5(b) likewise shows a right cylindrical molded body 31 to be located at the right or left side.
FIG. 5(c) likewise shows a central molded body 31 and cylindrical molded bodies 31, 31 at the right and left sides.
FIG. 5(d) is a sectional view of a state in which the cylindrical molded bodies 30, 31 and 32 are fitted and connected together around and integrally fixedly assembled to the outer peripheral of a rotary shaft 34.

Cylindrical molded bodies composed of a hydraulic composition having a formulation given in FIG. 4 (outer diameter 32 mm, inner diameter 12 mm, length 70 mm) were formed, and fitted and integrally and fixedly assembled around a rotary shaft made of SUM(diameter 12 mm×length 430 mm), thereby obtaining a paper feed roller as shown in FIG. 3. Paper feed rollers in Examples 6 to 9 were obtained in the above manner. The cylindrical molded bodies were assembled around the rotary shaft by using the first method. That is, after the cylindrical molded bodies shown in FIGS. 3(a), (b) and (c) were molded, released and cured, with use of an epoxy adhesive, three molded bodies (a) were attached around a central portion of the rotary shaft and the cylindrical molded bodies (b) and (c) were attached to opposite end portions of the rotary shaft, thereby obtaining a roller portion of 350 mm in length.

TABLE 4

| Formulation of hydraulic composition | |
| --- | --- |
| Cement | 70 parts by weight |
| Silica fume | 30 parts by weight |
| Acrylic resin | 9 parts by weight |
| Water | 25 parts by weight |
| Aggregate (No. 8) | 25 parts by weight |

(1) Warped Amount Test

As Comparative Example 6, a hollow paper feed roller made of SUM free cutting steel, 12 mm in outer diameter, was produced, and as Reference Example, a roller portion made of hydraulic composition (length 350 mm, outer diameter 32 mm) was integrally fixed around a rotary shaft of SUM free cutting steel (diameter 12 mm×length 430 mm).

With respect to the paper feed rollers thus obtained in Examples 6 to 9 and Comparative Examples 3, 4, the roller was supported at two points with a span of 300 mm, a load of 196·N·(20 kgf) was downwardly applied at a middle point of the two support points, and a warped amount under the load concentrated at the middle point was measured. Results are shown in Table 5.

TABLE 5

| | Warped amount (mm) | Remarks |
| --- | --- | --- |
| Example 6 (plane joint) | 0.38 | |
| Example 7 (telescopic joint) | 0.21 | Inserted depth 10 mm |
| Example 8 (telescopic joint) | 0.19 | Inserted depth 15 mm |
| Example 9 (telescopic joint) | 0.19 | Metal fittings used at engaged portions diameter 12 mm |
| Comparative Example 6 (SUM free cutting steel) | 0.56 | |
| Reference Example (Integrally molded) | 0.19 | |

As shown in the above results, Example 6 in which the cylindrical molded bodies are merely butted at their ends in the form of a plane joint around the rotary shaft has a slightly large warped amount (0.38 mm), which was in a sufficiently practically withstanding range. As compared with Comparative Example 6 made of SUM free cutting steel, Examples 7 to 9 in which the connecting end portions of the cylindrical molded bodies to be connected had interengageable shapes, and the cylindrical molded bodies are engaged and connected together at these end portions had smaller warped amounts and excellent. Examples 7 to 9 exhibited the warped amounts similar to that in Reference Example in which the roller portion made of the hydraulic composition was integrally fixed around the outer periphery of the SUM rotary shaft (2) Working Test With respect to other paper feed rollers in the above Examples 7 to 9 and Comparative Examples 6 and 7, the roller was ground with a centerless grinder with a grinding accuracy of ±0.002 mm at a given working speed. Comparative Example 7, an alumina sintered body (diameter 32 mm×length 350 mm) was integrally and fixedly formed around a rotary shaft (SUM, diameter 12 mm×length 430 mm). Results shown in Table 6 below.

TABLE 6

| | Working speed mm/min | Grinding speed mm | Remarks |
| --- | --- | --- | --- |
| Example 7 (telescopic joint) | 1650 | ±0.002 | |
| Example 8 (telescopic joint) | 1650 | ±0.002 | |
| Example 9 (telescopic joint) | 1650 | ±0.002 | |
| Comparative Example 6 (SUM free cutting steel) | 1500 | ±0.002 | |
| Comparative Example 7 (Alumina sintered body) | 120 | ±0.002 | Reference |

It is seen from the results in Table 6 that as compared with the paper feed roller made of SUM free cutting steel in Comparative Example 6, Examples 7 to 9 according to the present invention exhibited more excellent workability and Co that as compared with Comparative Example 4 in which the roller portion was fitted and integrally fixed around the rotary shaft, Examples 5 to 7 exhibited largely improved workability.

Figure 8:
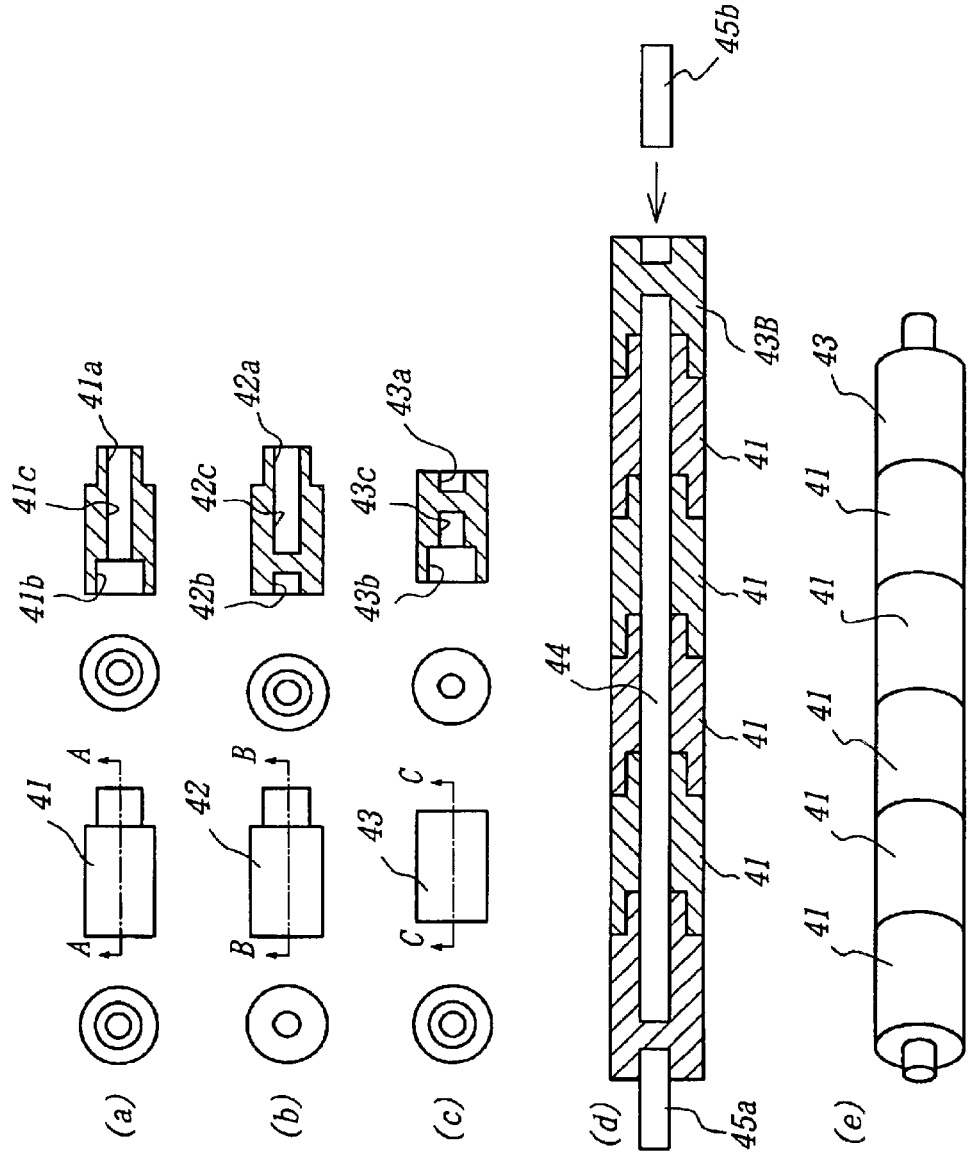
FIG. 8(a) shows a cylindrical molded body 41 in a central portion of a first embodiment of the paper feed roller according to the third aspect of the present invention with a left side view at the left, a front view neighboring on the right, a right side view neighboring on the right, and an A—A line sectional view neighboring on the right as cut and viewed along the A—A line in the front view.
FIG. 8(b) likewise shows a cylindrical molded body 22 at the left side.
FIG. 8(c) likewise shows a cylindrical molded body 23 at the right side.
FIG. 8(d) is a sectional view of a state in which the cylindrical molded bodies 41, 41, 41, 41, 42, 43 are connected by a connecting rod 44 and rotary shaft portions 45a are attached to end portion of the cylindrical roller portion.
FIG. 8(e) a sectional view of a state in which the cylindrical molded bodies are integrally fixed and assembled.

FIGS. 8 to 10 show preferred embodiments of the paper feed rollers according to the third aspect of the present invention. FIG. 8(a) to FIG. 8(e) shows a preferred embodiment of the paper feed roller according to the present invention. FIG. 8(a) shows a cylindrical molded body 41 in a central portion of the paper feed roller shown in a sectional view of FIG. 8(d) (before a right end rotary shaft portion is inserted and fixed into a hole of a cylindrical molded body), a left side view on the left, a front view neighboring on the right, a right side view further neighboring on the right, and a line A—A sectional view on the right as cut and viewed along the line A—A. 41a is a projection provided at a right end portion of the cylindrical molded body, and 41b is a recess at a left end portion, and 41c a through-hole for passing a connecting rod 44.

The projection 41a and the recess 41b are fitted to the recess 41b and the projection 41a of the adjacent cylindrical molded body to be connected, respectively. FIGS. 8(b) and 8(c) show cylindrical molded bodies 42, 43 at left and right sides of the paper feed roller shown in FIG. 8(d), respectively, and 42a is a projection provided at a right end portion of the cylindrical molded body, and 42b is a recess at a left end portion, and 42c a through-hole for passing a connecting rod 44. The projection 42a is fitted into the recess 41b of the adjacent cylindrical molded body to be connected, and an end portion of a rotary shaft portion 45a at the left is inserted into the recess 42b. Further, 43a, 43b and 43c are a recess to fit into that 41b of the adjacent molded body to be joined, a recess into which the right rotary shaft portion 45b is to be inserted, and a recess into which a right end portion of the connecting rod is to be inserted, respectively. Each of the cylindrical molded bodies is made of the hydraulic composition with a length of 50 to 100 mm, for example.

In the above cylindrical molded bodies, all of the inner peripheral surfaces of the recesses and the outer peripheral surfaces of the projections are formed concentrically with the outer peripheral surfaces of the cylindrical molded bodies. The outer diameters of the respective cylindrical molded bodies 41, 42, 43 are identical, while the inner diameter of the recesses into which the connecting rod is to be inserted are identical, so that when the cylindrical molded bodies are mutually connected, the outer peripheral surfaces of the cylindrical molded bodies and the inner peripheral surfaces of the recesses into which the connecting rod is to be inserted continuously extend, respectively. Thereby, the central hole and the outer peripheral surface are concentrical with each other and extend longitudinally in parallel to the rotary shaft This is the same for the other embodiments.

FIG. 8(e) is a perspective view of the paper feed roller in which the cylindrical roller portion is formed by the cylindrical molded bodies 41, 42, 43 made of the hydraulic composition, the rotary shaft is formed by the rotary shaft portions 45a and 45b inserted and fixed into left and right end portions of the cylindrical roller portion, respectively, and the rotary shaft is integrally connected to the cylindrical roller. The connecting rod 44 has a length of 250 to 350 mm, for example. The cylindrical molded bodies 41, 42 and 43 are preferably mutually firmly integrated with an appropriate adhesive, and preferably the cylindrical molded bodies are firmly integrally fixed around the outer periphery of the rotary shaft with appropriate adhesive.

In this case, it may be that after the cylindrical molded bodies 41, 41, 41, 41 are preliminarily connected and fixed, fitted around and mutually integrally connected with the connecting rod, the cylindrical molded bodies at the left and right end portions are fitted and fixed, and finally the left and right rotary shaft portions 45a and 45b are fitted and fixed. Alternatively, it may be that after the cylindrical molded bodies 41, 41, 41, 41 are successively fitted and mutually integrally connected around the outer periphery of the connecting rod 4, the paper feed roller is likewise assembled. Further, it may be that the cylindrical molded bodies 41, 41, 41, 41, 42, 43 are molded, released and cured, they are fitted, arranged and mutually integrally connected and fixed around the connecting rod 44, or that immediately after the cylindrical molded bodies are molded and released, they are fitted around the connecting rod, followed by curing to mutually integrally connecting and fixing them.

The circularity can be enhanced by centerlessly grinding the cylindrical roller portion. For example, accuracy of around 4/1000 mm can be realized for the circumferential deviation. With reference to the cylindrical roller having the circularity thus enhanced, the rotary shaft portions 45a and 45b are fitted and fixed into the cylindrical roller portion such that the rotary shaft portions may be concentric with the center of the cylindrical roller portion. The molded bodies 42, 43 at the opposite ends of the cylindrical roller portion are provided with the recesses 42b, 43b into which the rotary shaft portions 45a, 45b are inserted and fixed, respectively. If the inner diameter of the recess is smaller than the outer diameter of the rotary shaft portion, the rotary shaft portion can be pressed and fixed into the recess.

FIGS. 9(a) to 9(d) shows a further embodiment of the paper feed roller according to the present invention. This embodiment differs from FIG. 8 in that in molding a left cylindrical molded body 42A and a right cylindrical molded body 43A, none of recesses 42b and 43b for the attachment of the rotary shaft portions in the embodiment of FIG. 8 is provided, rotary shaft portions 45a, 45b having screw portions 45ax, 45bx formed at one ends thereof are screwed and fixed into the cylindrical molded bodies 42A, 43A, respectively. In the embodiment of FIG. 9, it may be that the cylindrical molded bodies are molded, released and cured, they are fitted, arranged and mutually integrally connected and fixed around the connecting rod 44, or that immediately after the cylindrical molded bodies are molded and released, they are fitted around the connecting rod, followed by curing to mutually integrally connecting them.

The rotary shaft portions 45a, 45b may be fixed to the cylindrical molded bodies 42A, 43A, respectively, by screwing them into the end portions of the cylindrical molded bodies, or after the cylindrical roller portion is formed, the rotary shaft portions 45a, 45b may be screwed into the cylindrical molded bodies located at the opposite portions of the formed cylindrical roller portion. Since the others are clear with reference to the figure, their explanation is omitted.

FIGS. 10(a) to 10(d) show a further embodiment of the paper feed roller according to the present invention. The embodiment in FIG. 10 differs from FIG. 8 only in that a left cylindrical molded body 42A and a right cylindrical molded body 43A are provided with holes with female screw portions at inner peripheral surfaces during the molding instead of those 42b and 43b for attachment of the rotary shaft portions in FIG. 8, and rotary shaft portions 45a, 45b are fixed to the cylindrical molded bodies 42B and 43B, respectively, by screwing male screw portions 45ax and 45bx provided at end portions of the rotary shaft portions 45a, 45b, respectively. The paper feed roller shown in FIG. 10 may be assembled according to the method shown in FIG. 1 except that the rotary shah portions are attached and fixed to the right and left cylindrical molded portions by screwing, respectively.

EXAMPLES 10 TO 12

In Example 10, after four cylindrical molded bodies (outer diameter 22 mm, inner diameter 8 mm, length 90 mm) were prepared from a hydraulic composition having the formulation in Table 4 as shown according to the construction of FIG. 8, cured and hardened, the cylindrical molded bodies were connected by a connecting core rod of free cutting steel (diameter 8 mm, length 300 mm). The circularity of the cylindrical roller portion was enhanced by centerless grinding, rotary shaft portion-fixing recesses(42b and 43b) were formed 8 mm in diameter and 20 mm at depth in the cylindrical molded bodies 42 and 43 in FIG. 8 with a fine lathe machine such that the rotary shaft portion-fixing recesses were concentric with the outer periphery of the cylindrical roller portion and rotary shafts made of free cutting steel(outer diameter 8 mm, length 50 mm) were inserted thereinto from opposite ends, thereby producing a paper feed roller.

Paper feed rollers in Examples 11 and 12 were produced in the structures of FIGS. 9 and 10, respectively, according to Example 10.

That is, the paper feed roller in Example 9 was produced in the same manner as in Example 10 except that in Example 10, after a cylindrical roller portion was centerlessly ground, rotary shaft portions 45a and 45b were screwed into end faces of the cylindrical roller portion at location concentric with the outer diameter thereof, and that in Example 12, after a cylindrical roller portion was centerlessly ground, holes were bored at end faces of the cylindrical roller portion at locations concentric with the outer diameter thereof with the fine lather machine, female screws were formed in those holes, and rotary shaft portions 45a and 45b of FIG. 10 were screwed thereinto.

A paper feed roller in Comparative Example 8 was produced according to Example 10 except that a single rotary shaft made of free cutting steel(outer diameter 8 mm, length 42 mm) was inserted through holes of cylindrical molded bodies to connect and fix them therearound.

A paper feed roller in Comparative Example 9 was produced according to Example 11 except that a single cylindrical molded body (outer diameter 22 mm, inner diameter 8 mm, length 360 mm) was inserted, connected and fixed.

(1) Deviation Test (Test 1) During a course of producing the above paper feed rollers, before the cylindrical roller portion was centerlessly ground, the cylindrical roller portion was placed and supported on a V-shaped block, and a deviation of the cylindrical roller portion was measured with a rotary dial gauge.

(Test 2) After the cylindrical roller portion was centerlessly ground, measurement was effected in the same manner as in Test 1.

(Test 3) After the paper feed roller was produced, the opposite end portions were placed and supported on a V-shaped block, and a deviation of the cylindrical roller portion was measured with the rotary dial gauge. In these tests, no working was effected to enhance the concentricity between the cylindrical roller portion and the rotary shaft, but the circularity was enhanced to at a high accuracy by centerlessly grinding the cylindrical roller portion(molded body) only. Therefore, the concentricity between the molded body and the rotary shaft before working the rotary shaft can be evaluated at a high accuracy. Results are shown in Table 7.

TABLE 7

| | Deviation accuracy (mm) | | |
|---|---|---|---|
| | Test 1 | Test 2 | Test 3 |
| Example 10 | 60/1000 | 4/1000 | 9/1000 |
| Example 11 | 60/1000 | 4/1000 | 9/1000 |
| Example 12 | 60/1000 | 4/1000 | 9/1000 |
| Comparative Example 8 | 60/1000 | 4/1000 | 50/1000 |
| Comparative Example 9 | 60/1000 | 4/1000 | 60/1000 |

It is seen from Table 7 that the deviation accuracy of each of the cylindrical roller portions was in a range of $60/1000$ to $90/1000$ mm before grinding, which was enhanced to $4/1000$ by centerless grinding.

However, the deviation accuracy of the cylindrical roller portion relative to the rotary shaft was $9/1000$ mm for Examples and $50/1000$ mm for Comparative Examples, which shows that the concentricity between the cylindrical roller portion and the rotary shaft was not enhanced by centerless grinding.

As shown from the above results, although the cylindrical roller portion was machined to the circularity of $4/1000$ mm for each of Examples 10 and 12 and Comparative Examples 8 and 9, the deviation between the rotary shaft and the cylindrical roller portion was suppressed to a low level of $9/1000$ mm in the assembled paper feed roller with respect to these Examples, whereas the deviations in Comparative Examples 8 and 9 were as much as $50/1000$ mm and $60/1000$ mm, respectively. Therefore, it is seen that the paper feed roller according to the present invention has very high accuracy.

What is claimed is:

1. A paper feed roller for use in printing machines, comprising:
    a rotary shaft, and
    a cylindrical roller portion integrated with an outer periphery of the rotary shaft;
    wherein the cylindrical roller portion comprises a hydraulic composition comprising a hydraulic powder and non-hydraulic powder and a workability improver,
    and said non-hydraulic powder is at least one selected from the group consisting of calcium carbonate powder, slug powder, fly ash powder, silica powder and silica fume powder, and said workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

2. The paper feed roller set forth in claim 1, wherein the rotary shaft is constituted by two rotary shaft portions, said two rotary shaft portions are aligned with each other and axially inwardly inserted integrally into central portions of respective opposite end faces of the cylindrical roller portion from opposite sides such that the rotary shaft portions are concentric with an outer peripheral face of the cylindrical roller portion.

3. The paper feed roller set forth in claim 1, wherein the hydraulic composition comprises 100 parts by weight of a mixed powder and 2 to 18 parts by weight of the workability improver, said mixed powder comprising 50 to 90% by weight of the hydraulic powder, and 10 to 50% by weight of the non-hydraulic powder, and said non-hydraulic powder having an average particle diameter smaller than that of the hydraulic powder by an order of one digit or more.

4. A paper feed roller for use in printing machines, comprising:
    a rotary shaft, and
    a cylindrical roller portion integrated with an outer periphery of the rotary shaft and formed by connecting a plurality of cylindrical molded bodies in a direction of the rotary shaft;
    wherein the cylindrical roller portion comprises a hydraulic composition comprising a hydraulic powder and a non-hydraulic powder and a workability improver,
    and said non-hydraulic powder is at least one selected from the group consisting of calcium carbonate powder, slug powder, fly ash powder, silica powder and silica fume powder, and said workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

5. The paper feed roller set forth in claim 4, wherein at least one set of two adjacent cylindrical molded bodies connected is connection-reinforced with a connecting core rod extending over the two cylindrical molded bodies.

6. The paper feed roller set forth in claim 4, wherein connecting end portions of the cylindrical molded bodies to be connected to each other have interengaging shapes, and said cylindrical molded bodies are connected by engagement at said end portions.

7. The paper feed roller set forth in claim 4, wherein the rotary shaft is constituted by two rotary shaft portions, said two rotary shaft portions are aligned with each other and axially inwardly inserted integrally into central portions of respective opposite end faces of the cylindrical roller portion from opposite sides such that the rotary shaft portions are concentric with an outer peripheral face of the cylindrical roller portion.

8. A method for producing a paper feed roller for use in printing machines, comprising the steps of:
    forming a plurality of cylindrical molded bodies, each of which bodies having a hole at a center portion, by press molding, releasing, curing and hardening, hydraulic composition comprising a hydraulic powder and a non-hydraulic powder and a workability improver,
    inserting a rotary shaft through the holes of the plurality of cylindrical molded bodies, and connecting adjacent said cylindrical molded bodies, and thereby integrally forming a cylindrical roller portion around an outer peripheral surface of the rotary shaft;

wherein said non-hydraulic powder is at least one selected from the group consisting of calcium carbonate powder, slug powder, fly ash powder, silica powder and silica fume powder, and the workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

9. The paper feed roller-producing method set forth in claim 8, wherein connecting end portions of the cylindrical molded bodies to be connected to each other are molded to have interengaging shapes, and said cylindrical molded bodies are connected by engagement at said end portions.

10. A method for producing a paper feed roller for use in printing machines, comprising the steps of:

forming a plurality of cylindrical green press molded bodies each having a hole at a central portion by press molding a mixture of a hydraulic composition comprising a hydraulic powder and a non-hydraulic powder and a workability improver, releasing the cylindrical green press molded bodies, inserting a rotary shaft through the holes of the plurality of the cylindrical green press molded bodies, connecting adjacent said cylindrical green press molded bodies, and forming a cylindrical shaped body through curing and hardening the connected cylindrical green press molded bodies, so as to integrally form a cylindrical roller portion around an outer peripheral surface of the rotary shaft;

wherein said non-hydraulic powder is at least one selected from the group consisting of calcium carbonate powder, slug powder, fly ash powder, silica powder and silica fume powder, and the workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

11. The paper feed roller-producing method set forth in claim 10, wherein connecting end portions of the cylindrical green press molded bodies to be connected to each other are molded to have interengaging shapes, and said cylindrical green press molded bodies are connected by engagement at said end portions.

12. A method for producing a paper feed roller for use in printing machines, comprising the steps of:

forming a cylindrical roller portion from a cylindrical press molded body shaped through press molding, releasing, curing and hardening a hydraulic composition comprising a hydraulic powder and a non-hydraulic powder and a workability improver, arranging two rotary shaft portions to be concentric with an outer peripheral surface of the cylindrical roller portion, and attaching the two rotary shaft portions to opposite end portions of the cylindrical roller portion, the two rotary shaft portions being aligned with each other, so as to form a rotary shaft by the two rotary shaft portions;

wherein said non-hydraulic powder is at least one selected from the group consisting of calcium carbonate powder, slug powder, fly ash powder, silica powder and silica fume powder, and the workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

13. The paper feed roller-producing method set forth in claim 12, wherein the cylindrical molded body is formed such that holes are provided at center portions of opposite end portions of the cylindrical roller portion to make the holes concentric with the outer peripheral surface of the cylindrical roller portion, the two rotary shaft portions being inserted and integrally fixed into the holes, respectively, such that the rotary shaft portions are aligned with each other, and thereby the rotary shaft is constituted by the two rotary shaft portions.

14. The paper feed roller-producing method set forth in claim 12, wherein a screw portion is provided at one end portion of the rotary shaft portion, and the rotary shaft portion is attached to the end portion of the cylindrical roller portion by screwing the screw portion of the rotary shaft portion thereinto.

15. The paper feed roller-producing method set forth in claim 12, wherein a plurality of cylindrical press molded bodies are formed through press molding, releasing, curing and hardening the hydraulic composition, and the cylindrical roller portion is formed by connecting the cylindrical press molded bodies together.

16. The paper feed roller-producing method set forth in claim 15, wherein at least one set of adjacent cylindrical press molded bodies are connected by a connecting core rod.

17. The paper feed roller-producing method set forth in claim 15, wherein connecting end portions of the cylindrical press molded bodies to be connected to each other are molded to have interengaging shapes, and said cylindrical press molded bodies are connected by engagement at said end portions.

18. A method for producing a paper feed roller for use in printing machines, comprising the steps of:

press molding a hydraulic composition comprising a hydraulic powder and a non-hydraulic powder and a workability improver to produce cylindrical green press molded bodies, releasing the cylindrical green press molded bodies, forming a cylindrical roller portion from the cylindrical green press molded bodies, arranging two rotary shaft portions to be concentric with an outer peripheral surface of the cylindrical roller portion, and attaching the two rotary shaft portions to opposite end portions of the cylindrical roller portion, the two rotary shaft portions being aligned with each other, so as to form a rotary shaft by the two rotary shaft portions, and curing and hardening the cylindrical roller portion while arranged on the rotary shaft;

wherein said non-hydraulic powder is at least one selected from the group consisting of calcium carbonate powder, slug powder, fly ash powder, silica powder and silica fume powder, and the workability improver is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

19. The paper feed roller-producing method set forth in claim 18, wherein the cylindrical green molded bodies are formed such that holes are provided at center portions of opposite end portions of the cylindrical roller portion to make the holes concentric with the outer peripheral surface of the cylindrical roller portion, the two rotary shaft portions being inserted and integrally fixed into the holes, respectively, such that the rotary shaft portions are aligned with each other, and thereby the rotary shaft is constituted by the two rotary shaft portions.

20. The paper feed roller-producing method set forth in claim 19, wherein at least one set of adjacent said cylindrical green press molded bodies are connected by a connecting core rod.

21. The paper feed roller-producing method set forth in claim 18, wherein a screw portion is provided at one end portion of the rotary shaft portion, and the rotary shaft portion is attached to the end portion of the cylindrical roller portion by screwing the screw portion of the rotary shaft portion thereinto.

22. The paper feed roller-producing method Bet forth in claim 18, wherein a plurality of cylindrical green press molded bodies are formed by molding and releasing the hydraulic composition and the cylindrical green press molded bodies are connected together, and the connected green press molded bodies are cured and hardened to form the cylindrical roller portion.

23. The paper feed roller-producing method set forth in claim 22, wherein connecting end portions of the cylindrical green press molded bodies to be connected to each other are molded to have interengaging shapes, and said cylindrical green press molded bodies are connected by engagement at said end portions.

24. A method for producing a paper feed roller, comprising the steps of:

forming a plurality of cylindrical molded bodies by press molding a mixture of a hydraulic composition comprising a hydraulic powder and a non-hydraulic powder and a means for improving moldability and mold-releasability of the cylindrical molded bodies, each of the cylindrical molded bodies having a hole at a central portion through molding the hydraulic composition, releasing, curing and hardening the molded bodies, inserting a rotary shaft through the holes of the plurality of cylindrical molded bodies, and connecting adjacent said cylindrical molded bodies, and thereby integrally forming a cylindrical roller portion around an outer peripheral surface of the rotary shaft.

25. The method of claim 24, wherein the means for improving moldability and mold-releasability is also a means for improving cutting/grinding workability and grinding accuracy of the molded bodies.

26. The method of claim 25, wherein the means for improving moldability, mold-releasability, cutting/grinding workability, and grinding accuracy of the cylindrical molded bodies is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

27. The method of claim 24, wherein the means for improving moldability and mold-releasability of the cylindrical molded bodies is one of a powder and an emulsion of at least one resin selected from the group consisting of: vinyl acetate resin, a copolymer resin with vinyl acetate, acrylic resin, a copolymer resin with acryl, styrene resin, a copolymer resin with styrene, and an epoxy resin.

* * * * *